United States Patent
Micu et al.

(10) Patent No.: US 12,201,068 B2
(45) Date of Patent: *Jan. 21, 2025

(54) IRRIGATION CONTROLLER WITH RELAYS

(71) Applicant: Rain Bird Corporation, Azusa, CA (US)

(72) Inventors: Anderson Micu, San Diego, CA (US); Andrew M. Nguyen, San Diego, CA (US); Jonathan I. Marsters, San Diego, CA (US); Harvey J. Nickerson, El Cajon, CA (US); Daniel B. Zimet, Carlsbad, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,741

(22) Filed: Sep. 20, 2023

(65) Prior Publication Data

US 2024/0008431 A1    Jan. 11, 2024

Related U.S. Application Data

(63) Continuation of application No. 17/549,446, filed on Dec. 13, 2021, now Pat. No. 11,793,129, which is a
(Continued)

(51) Int. Cl.
*A01G 25/16*    (2006.01)
*G05B 19/042*    (2006.01)

(52) U.S. Cl.
CPC ......... *A01G 25/165* (2013.01); *G05B 19/042* (2013.01); *A01G 25/167* (2013.01);
(Continued)

(58) Field of Classification Search
CPC .. A01G 25/165; A01G 25/167; G05B 19/042; G05B 19/0423; G05B 2219/25257; G05B 2219/2625; Y02A 40/22
See application file for complete search history.

(56) References Cited

U.S. PATENT DOCUMENTS

| | | |
|---|---|---|
| 944,556 A | 12/1909 | Hovey |
| 3,729,710 A | 4/1973 | Sherwin |

(Continued)

FOREIGN PATENT DOCUMENTS

| | | |
|---|---|---|
| GB | 2177582 A | 1/1987 |
| WO | 02058254 A1 | 7/2002 |

OTHER PUBLICATIONS

Rain Bird; "ESP-LXD 2-Wire Decoder Control System Installation & Troubleshooting Guide"; https://www.rainbird.com/sites/default/files/media/documents/2018-02/man_ESP-LXD2-WireDecoderInstallationTroubleshootingGuide.pdf; Available at least as early as Oct. 2013; pp. 1-38.

(Continued)

*Primary Examiner* — M. N. Von Buhr
(74) *Attorney, Agent, or Firm* — Fitch, Even, Tabin & Flannery LLP

(57) ABSTRACT

In some embodiments, systems and methods provide an output unit for an irrigation controller comprising: a housing; an input port; a microcontroller; a modulator; a plurality of switches coupled to an output of the modulator and independently controlled by the microcontroller; and a plurality of two-wire path output connectors each coupled to a corresponding one of the plurality of switches, wherein each of the plurality of two-wire path output connectors is configured to be connected to a corresponding two-wire path of a plurality of two-wire paths which extend out of the irrigation controller and to which multiple decoder-based irrigation control units can be connected and controlled, wherein the microcontroller is further configured to operate the plurality of switches to couple and decouple the modulated power signals from the output of the modulator to one or more of the plurality of two-wire path output connectors.

20 Claims, 13 Drawing Sheets

Related U.S. Application Data continuation of application No. 16/586,729, filed on Sep. 27, 2019, now Pat. No. 11,234,380.

(60) Provisional application No. 62/737,382, filed on Sep. 27, 2018.

(52) U.S. Cl.
CPC .............. *G05B 2219/25257* (2013.01); *G05B 2219/2625* (2013.01)

(56) References Cited

U.S. PATENT DOCUMENTS

| | | | |
|---|---|---|---|
| 3,747,620 A | 7/1973 | Kah, Jr. |
| 3,989,066 A | 11/1976 | Sturman |
| 4,007,458 A | 2/1977 | Hollabaugh |
| 4,121,114 A | 10/1978 | Ruggles |
| 4,131,882 A | 12/1978 | Hollabaugh |
| 4,165,532 A | 8/1979 | Kendall |
| 4,176,395 A | 11/1979 | Evelyn-Veere |
| 4,241,375 A | 12/1980 | Ruggles |
| 4,270,573 A | 6/1981 | Sturman |
| 4,423,484 A | 12/1983 | Hamilton |
| 4,464,621 A | 8/1984 | Prigent |
| 4,535,401 A | 8/1985 | Penn |
| 4,540,890 A | 9/1985 | Gangemi |
| 4,548,225 A | 10/1985 | Busalacchi |
| 4,562,506 A | 12/1985 | Moran |
| 4,645,882 A | 2/1987 | Nakayama |
| 4,716,490 A | 12/1987 | Alexanian |
| 4,718,454 A | 1/1988 | Appleby |
| 4,777,556 A | 10/1988 | Imran |
| 4,811,221 A | 3/1989 | Sturman |
| 5,021,939 A | 6/1991 | Pulgiese |
| 5,048,755 A | 9/1991 | Dodds |
| 5,079,667 A | 1/1992 | Kasano |
| 5,229,649 A | 7/1993 | Nielsen |
| 5,251,153 A | 10/1993 | Nielsen |
| 5,333,785 A | 8/1994 | Dodds |
| 5,347,421 A | 9/1994 | Alexanian |
| 5,402,303 A | 3/1995 | Luck |
| 5,485,400 A | 1/1996 | Warrior |
| 5,655,561 A | 8/1997 | Wendel |
| 5,661,349 A | 8/1997 | Luck |
| 5,740,031 A | 4/1998 | Gagnon |
| 5,760,706 A | 6/1998 | Kiss |
| 5,780,938 A | 7/1998 | Edwards |
| 5,825,664 A | 10/1998 | Warrior |
| 5,826,619 A | 10/1998 | Roman |
| 5,839,658 A | 11/1998 | Sarver |
| 5,848,609 A | 12/1998 | Marchesseault |
| 5,914,847 A | 6/1999 | Alexanian |
| 5,938,172 A | 8/1999 | Ohtsuka |
| 5,956,248 A | 9/1999 | Williams |
| 6,021,038 A | 2/2000 | Hanchett |
| 6,098,898 A | 8/2000 | Storch |
| 6,126,141 A | 10/2000 | Geiger |
| 6,154,354 A | 11/2000 | Alexanian |
| 6,254,432 B1 | 7/2001 | Yoshigi |
| 6,283,139 B1 | 9/2001 | Symonds |
| 6,298,285 B1 | 10/2001 | Addink |
| 6,335,855 B1 | 1/2002 | Alexanian |
| 6,337,635 B1 | 1/2002 | Ericsen |
| 6,351,366 B1 | 2/2002 | Alexanian |
| 6,378,838 B1 | 4/2002 | Brundisini |
| 6,402,048 B1 | 6/2002 | Collins |
| 6,452,499 B1 | 9/2002 | Runge |
| 6,459,959 B1 | 10/2002 | Williams |
| 6,600,971 B1 | 7/2003 | Smith |
| 6,688,535 B2 | 2/2004 | Collins |
| 6,694,223 B1 | 2/2004 | Goldberg |
| 6,721,630 B1 | 4/2004 | Woytowitz |
| 6,763,287 B2 | 7/2004 | Brundisini |
| 6,766,221 B1 | 7/2004 | Christiansen |
| 6,782,310 B2 | 8/2004 | Bailey |
| 6,782,311 B2 | 8/2004 | Barlow |
| 6,812,826 B2 | 11/2004 | Buhler |
| 6,823,239 B2 | 11/2004 | Sieminski |
| 6,842,667 B2 | 1/2005 | Beutler |
| 6,898,467 B1 | 5/2005 | Smith |
| 6,948,697 B2 | 9/2005 | Herbert |
| 6,993,416 B2 | 1/2006 | Christiansen |
| 6,996,457 B2 | 2/2006 | Williams |
| 7,058,479 B2 | 6/2006 | Miller |
| 7,069,115 B1 | 6/2006 | Woytowitz |
| 7,084,741 B2 | 8/2006 | Plummer |
| 7,097,113 B2 | 8/2006 | Ivans |
| 7,146,255 B2 | 12/2006 | Christiansen |
| 7,169,115 B2 | 1/2007 | Nobis |
| 7,181,319 B1 | 2/2007 | Woytowtiz |
| 7,182,272 B1 | 2/2007 | Marian |
| 7,206,669 B2 | 4/2007 | Christiansen |
| 7,216,020 B2 | 5/2007 | Marian |
| 7,225,037 B2 | 5/2007 | Shani |
| 7,245,991 B1 | 7/2007 | Woytowitz |
| 7,248,945 B1 | 7/2007 | Woytowitz |
| 7,250,860 B2 | 7/2007 | Smith |
| 7,257,465 B2 | 8/2007 | Perez |
| 7,272,456 B2 | 9/2007 | Farchmin |
| 7,286,904 B2 | 10/2007 | Graham |
| 7,289,886 B1 | 10/2007 | Woytowitz |
| 7,298,252 B1 | 11/2007 | Sutardja |
| 7,305,280 B2 | 12/2007 | Marian |
| 7,315,764 B1 | 1/2008 | Sutardja |
| 7,317,972 B2 | 1/2008 | Addink |
| 7,328,089 B2 | 2/2008 | Curren |
| 7,337,042 B2 | 2/2008 | Marian |
| 7,358,626 B2 | 4/2008 | Gardner |
| 7,359,769 B2 | 4/2008 | Bailey |
| 7,383,721 B2 | 6/2008 | Parsons |
| 7,398,139 B1 | 7/2008 | Woytowitz |
| 7,400,944 B2 | 7/2008 | Bailey |
| 7,403,840 B2 | 7/2008 | Moore |
| 7,406,363 B2 | 7/2008 | Doering |
| 7,412,303 B1 | 8/2008 | Porter |
| 7,421,317 B2 | 9/2008 | Christiansen |
| 7,438,588 B2 | 10/2008 | Rhodes |
| 7,444,207 B2 | 10/2008 | Nickerson |
| 7,457,676 B1 | 11/2008 | Sutardja |
| 7,457,678 B2 | 11/2008 | Smith |
| 7,458,521 B2 | 12/2008 | Ivans |
| 7,494,070 B2 | 2/2009 | Collins |
| 7,510,542 B2 | 3/2009 | Blight |
| 7,522,039 B2 | 4/2009 | Sutardja |
| 7,522,975 B2 | 4/2009 | Perez |
| 7,526,365 B1 | 4/2009 | Frerich |
| 7,529,806 B1 | 5/2009 | Shteyn |
| 7,546,172 B1 | 6/2009 | Sutardja |
| 7,552,632 B2 | 6/2009 | Runge |
| 7,558,650 B2 | 7/2009 | Thornton |
| 7,574,285 B2 | 8/2009 | Kah |
| 7,577,247 B1 | 8/2009 | Sutardja |
| 7,584,023 B1 | 9/2009 | Palmer |
| 7,606,637 B2 | 10/2009 | Habing |
| 7,613,546 B2 | 11/2009 | Nelson |
| 7,613,547 B1 | 11/2009 | Woytowitz |
| 7,619,322 B2 | 11/2009 | Gardner |
| 7,640,079 B2 | 12/2009 | Nickerson |
| D607,847 S | 1/2010 | Elliott |
| 7,772,726 B1 | 8/2010 | Porter |
| 7,778,736 B2 | 8/2010 | Sutardja |
| 7,792,612 B2 | 9/2010 | Kah |
| 7,805,221 B2 | 9/2010 | Nickerson |
| 7,822,511 B2 | 10/2010 | Ivans |
| 7,826,931 B2 | 11/2010 | Lorenz |
| 7,831,321 B2 | 11/2010 | Ebrom |
| 7,844,367 B2 | 11/2010 | Nickerson |
| 7,844,368 B2 | 11/2010 | Alexanian |
| 7,844,369 B2 | 11/2010 | Nickerson |
| 7,853,363 B1 | 12/2010 | Porter |
| 7,856,737 B2 | 12/2010 | Mcmahon, Jr. |
| 7,877,168 B1 | 1/2011 | Porter |
| 7,883,027 B2 | 2/2011 | Fekete |
| 7,899,581 B1 | 3/2011 | Woytowitz |

(56) References Cited

U.S. PATENT DOCUMENTS

| | | |
|---|---|---|
| 7,913,653 B2 | 3/2011 | Jordan |
| 7,916,458 B2 | 3/2011 | Nelson |
| 7,930,069 B2 | 4/2011 | Savelle |
| 7,949,433 B2 | 5/2011 | Hern |
| 7,953,517 B1 | 5/2011 | Porter |
| 7,962,244 B2 | 6/2011 | Alexanian |
| 7,996,115 B2 | 8/2011 | Nickerson |
| 8,006,897 B1 | 8/2011 | Douglass |
| 8,010,238 B2 | 8/2011 | Ensworth |
| 8,014,904 B1 | 9/2011 | Woytowitz |
| 8,019,482 B2 | 9/2011 | Sutardja |
| 8,024,075 B2 | 9/2011 | Fekete |
| 8,055,389 B2 | 11/2011 | Holindrake |
| 8,104,993 B2 | 1/2012 | Hitt |
| 8,108,078 B2 | 1/2012 | Lorenz |
| 8,109,078 B2 | 2/2012 | Johannes |
| 8,136,484 B2 | 3/2012 | Jordan |
| 8,145,331 B2 | 3/2012 | Sutardja |
| 8,145,332 B2 | 3/2012 | Sutardja |
| 8,150,554 B2 | 4/2012 | Anderson |
| 8,158,248 B2 | 4/2012 | Hara |
| 8,160,750 B2 | 4/2012 | Weiler |
| 8,170,721 B2 | 5/2012 | Nickerson |
| 8,183,719 B2 | 5/2012 | Scripca |
| 8,185,248 B2 | 5/2012 | Ensworth |
| 8,193,930 B2 | 6/2012 | Petite |
| 8,200,368 B2 | 6/2012 | Nickerson |
| 8,215,570 B2 | 7/2012 | Hitt |
| 8,217,781 B2 | 7/2012 | Ebrom |
| 8,219,254 B2 | 7/2012 | O'connor |
| 8,219,935 B2 | 7/2012 | Hunts |
| 8,224,493 B2 | 7/2012 | Walker |
| 8,234,014 B1 | 7/2012 | Ingle |
| 8,244,404 B2 | 8/2012 | Nickerson |
| 8,257,111 B1 | 9/2012 | Smutny |
| 8,260,465 B2 | 9/2012 | Crist |
| 8,265,797 B2 | 9/2012 | Nickerson |
| 8,271,144 B2 | 9/2012 | Kah |
| 8,274,171 B2 | 9/2012 | Korol |
| 8,275,309 B2 | 9/2012 | Woytowitz |
| 8,285,421 B2 | 10/2012 | Vander Griend |
| 8,285,460 B2 | 10/2012 | Hoffman |
| 8,295,985 B2 | 10/2012 | Crist |
| 8,302,882 B2 | 11/2012 | Nelson |
| 8,321,365 B2 | 11/2012 | Anderson |
| 8,322,072 B2 | 12/2012 | Anderson |
| 8,326,440 B2 | 12/2012 | Christfort |
| 8,352,088 B2 | 1/2013 | Christiansen |
| 8,374,710 B2 | 2/2013 | Sutardja |
| 8,374,726 B2 | 2/2013 | Holindrake |
| 8,379,648 B1 | 2/2013 | Qu |
| 8,396,603 B2 | 3/2013 | Savelle |
| 8,401,705 B2 | 3/2013 | Alexanian |
| 8,417,390 B2 | 4/2013 | Nickerson |
| 8,433,448 B2 | 4/2013 | Walker |
| 8,436,559 B2 | 5/2013 | Kidd |
| 8,437,879 B2 | 5/2013 | Anderson |
| 8,443,822 B2 | 5/2013 | Ivans |
| 8,458,307 B2 | 6/2013 | Seelman |
| 8,477,021 B2 | 7/2013 | Slack |
| 8,494,683 B2 | 7/2013 | Piper |
| 8,497,597 B2 | 7/2013 | Korol |
| 8,504,210 B2 | 8/2013 | Ensworth |
| 8,509,683 B2 | 8/2013 | Woytowitz |
| 8,532,831 B2 | 9/2013 | Crist |
| 8,538,592 B2 | 9/2013 | Alexanian |
| 8,573,049 B1 | 11/2013 | Ware |
| 8,606,415 B1 | 12/2013 | Woytowitz |
| 8,608,404 B2 | 12/2013 | Safreno |
| 8,615,329 B2 | 12/2013 | O'connor |
| 8,619,819 B2 | 12/2013 | Seelman |
| 8,620,480 B2 | 12/2013 | Alexanian |
| 8,620,481 B2 | 12/2013 | Holindrake |
| 8,630,743 B2 | 1/2014 | Marsters |
| 8,638,009 B2 | 1/2014 | Korol |
| 8,649,907 B2 | 2/2014 | Ersavas |
| 8,649,910 B2 | 2/2014 | Nickerson |
| 8,659,183 B2 | 2/2014 | Crist |
| 8,660,705 B2 | 2/2014 | Woytowitz |
| 8,680,983 B2 | 3/2014 | Ebrom |
| 8,681,610 B1 | 3/2014 | Mukerji |
| 8,700,222 B1 | 4/2014 | Woytowitz |
| 8,706,307 B2 | 4/2014 | Weiler |
| 8,733,165 B2 | 5/2014 | Hern |
| 8,738,181 B2 | 5/2014 | Greer |
| 8,738,188 B2 | 5/2014 | Nickerson |
| 8,738,189 B2 | 5/2014 | Alexanian |
| 8,739,025 B2 | 5/2014 | Haila |
| 8,744,773 B2 | 6/2014 | Woytowitz |
| 8,793,025 B2 | 7/2014 | Lorenz |
| 8,796,879 B2 | 8/2014 | Korol |
| 8,812,007 B2 | 8/2014 | Hitt |
| 8,819,432 B2 | 8/2014 | Bergsten |
| 8,840,084 B2 | 9/2014 | Crist |
| 8,849,461 B2 | 9/2014 | Ersavas |
| 8,851,447 B2 | 10/2014 | Crist |
| 8,868,246 B2 | 10/2014 | Thornton |
| 8,874,275 B2 | 10/2014 | Alexanian |
| 8,878,465 B2 | 11/2014 | Kidd |
| 8,897,899 B2 | 11/2014 | Marsters |
| 8,909,381 B2 | 12/2014 | Crist |
| 8,924,032 B2 | 12/2014 | Woytowitz |
| 8,924,891 B2 | 12/2014 | Hunts |
| 8,930,032 B2 | 1/2015 | Shupe |
| 8,948,921 B2 | 2/2015 | Halahan |
| 8,977,400 B1 | 3/2015 | Porter |
| 8,989,908 B2 | 3/2015 | Marsters |
| 9,007,050 B2 | 4/2015 | Hill |
| 9,032,998 B2 | 5/2015 | O'brien |
| 9,043,036 B2 | 5/2015 | Fekete |
| 9,043,964 B2 | 6/2015 | Nickerson |
| 9,069,071 B1 | 6/2015 | Schlautman |
| 9,079,748 B2 | 7/2015 | Tracey |
| 9,081,376 B2 | 7/2015 | Woytowitz |
| 9,128,489 B2 | 9/2015 | Bauman |
| 9,141,619 B2 | 9/2015 | Sutardja |
| 9,144,204 B2 | 9/2015 | Redmond |
| 9,153,970 B2 | 10/2015 | Scripca |
| 9,155,254 B2 | 10/2015 | Edwards |
| 9,161,499 B2 | 10/2015 | Bailey |
| 9,164,177 B1 | 10/2015 | Schlautman |
| 9,169,944 B1 | 10/2015 | Dunn |
| 9,192,110 B2 | 11/2015 | Standerfer |
| 9,200,985 B2 | 12/2015 | Rice |
| 9,241,451 B2 | 1/2016 | Ersavas |
| 9,244,449 B2 | 1/2016 | Tennyson |
| 9,258,952 B2 | 2/2016 | Walker |
| 9,280,885 B2 | 3/2016 | Frederick |
| 9,296,004 B1 | 3/2016 | Clark |
| 9,297,839 B2 | 3/2016 | Romney |
| 9,307,620 B2 | 4/2016 | Woytowitz |
| 9,320,205 B2 | 4/2016 | Ensworth |
| 9,348,338 B2 | 5/2016 | Nickerson |
| 9,356,226 B2 | 5/2016 | Pargas |
| 9,408,353 B2 | 8/2016 | Neesen |
| 9,414,552 B2 | 8/2016 | Halahan |
| 9,418,530 B2 | 8/2016 | Rapaport |
| 9,439,369 B2 | 9/2016 | Christiansen |
| 9,442,474 B2 | 9/2016 | Madonna |
| 9,445,556 B2 | 9/2016 | Marsters |
| 9,468,162 B2 | 10/2016 | Weiler |
| 9,468,163 B2 | 10/2016 | Hashimshony |
| 9,478,119 B1 | 10/2016 | Rapaport |
| 9,500,770 B2 | 11/2016 | Hern |
| 9,538,713 B2 | 1/2017 | Pearson |
| 9,539,602 B2 | 1/2017 | Wright, III |
| 9,547,313 B2 | 1/2017 | Nickerson |
| 9,555,432 B2 | 1/2017 | Mclain |
| 9,565,810 B2 | 2/2017 | Eng |
| 9,577,415 B1 | 2/2017 | Veloskey |
| 9,578,817 B2 | 2/2017 | Dunn |
| 9,579,790 B2 | 2/2017 | Laurent |
| 9,590,537 B2 | 3/2017 | Pasche |
| 9,618,137 B2 | 4/2017 | Ferrer Herrera |

(56) References Cited

U.S. PATENT DOCUMENTS

| | | |
|---|---|---|
| 9,623,431 B2 | 4/2017 | Lichte |
| 9,655,312 B1 | 5/2017 | Griggs |
| 9,665,106 B2 | 5/2017 | Lorenz |
| 9,678,485 B2 | 6/2017 | Malaugh |
| 9,681,610 B2 | 6/2017 | Crist |
| 9,693,510 B2 | 7/2017 | Ferrer Herrera |
| 9,699,974 B2 | 7/2017 | Clark |
| 9,703,275 B2 | 7/2017 | Ersavas |
| 9,717,191 B2 | 8/2017 | Endrizzi |
| 9,747,538 B2 | 8/2017 | Gudan |
| D797,682 S | 9/2017 | Sharp |
| 9,756,797 B2 | 9/2017 | Sarver |
| 9,763,394 B2 | 9/2017 | Fayazi-Azad |
| 9,763,396 B2 | 9/2017 | Endrizzi |
| 9,775,307 B2 | 10/2017 | Bartlett |
| 9,781,887 B2 | 10/2017 | Woytowitz |
| 9,786,422 B2 | 10/2017 | Edwards |
| 9,792,557 B2 | 10/2017 | Mathur |
| 9,817,380 B2 | 11/2017 | Bangalore |
| D808,908 S | 1/2018 | Paul |
| 9,872,445 B2 | 1/2018 | Cline |
| 9,880,537 B2 | 1/2018 | Mewes |
| D810,700 S | 2/2018 | Jenkins |
| 9,889,458 B2 | 2/2018 | Lichte |
| 9,933,778 B2 | 4/2018 | Hamann |
| 9,939,297 B1 | 4/2018 | Eyring |
| 9,959,507 B2 | 5/2018 | Mathur |
| 9,964,231 B2 | 5/2018 | Ferrer Herrera |
| 9,980,442 B2 | 5/2018 | Marsters |
| 9,986,696 B2 | 6/2018 | Halahan |
| 10,010,031 B1 | 7/2018 | Liu |
| 10,015,894 B2 | 7/2018 | Veloskey |
| 10,021,842 B2 | 7/2018 | Martinez |
| 10,025,284 B2 | 7/2018 | Nickerson |
| 10,039,241 B2 | 8/2018 | Weiler |
| 10,058,042 B2 | 8/2018 | Crist |
| 10,070,596 B2 | 9/2018 | Crist |
| 10,113,287 B2 | 10/2018 | Christiansen |
| 10,166,565 B2 | 1/2019 | Lemkin |
| 10,188,050 B2 | 1/2019 | Walker |
| 10,194,599 B2 | 2/2019 | Ensworth |
| 10,201,133 B2 | 2/2019 | Tennyson |
| 10,206,342 B2 | 2/2019 | Redmond |
| 10,225,996 B1 | 3/2019 | Kremicki |
| 10,228,711 B2 | 3/2019 | Woytowitz |
| 10,231,391 B2 | 3/2019 | Standerfer |
| 10,270,853 B2 | 4/2019 | Toepke |
| 10,278,181 B2 | 4/2019 | Hall |
| 10,292,343 B2 | 5/2019 | Weiler |
| 10,302,220 B2 | 5/2019 | Ferrer Herrera |
| 10,306,844 B1 | 6/2019 | Levine |
| 10,327,397 B2 | 6/2019 | Olive-Chahinian |
| 10,328,444 B2 | 6/2019 | Wright, III |
| 10,345,487 B2 | 7/2019 | Hern |
| 10,359,788 B2 | 7/2019 | Gutierrez |
| 10,368,503 B2 | 8/2019 | Kah, Jr. |
| 10,374,931 B2 | 8/2019 | Hall |
| 10,390,502 B2 | 8/2019 | Lorenz |
| 10,409,296 B1 | 9/2019 | Elle |
| 10,420,295 B2 | 9/2019 | Marsters |
| 10,444,769 B2 | 10/2019 | Weiler |
| 10,582,673 B2 | 3/2020 | Nickerson |
| 10,582,674 B2 | 3/2020 | Walker |
| 10,609,877 B2 | 4/2020 | Ferrer Herrera |
| 10,609,878 B2 | 4/2020 | Montgomery |
| 10,653,081 B2 | 5/2020 | Marsters |
| 10,663,941 B2 | 5/2020 | Nickerson |
| 10,677,375 B2 | 6/2020 | Ferrer Herrera |
| 10,732,320 B2 | 8/2020 | Hern |
| 10,757,873 B2 | 9/2020 | Weiler |
| 10,772,267 B2 | 9/2020 | Tennyson |
| 10,842,091 B2 | 11/2020 | Crist |
| 10,842,092 B2 | 11/2020 | Crist |
| 10,863,682 B2 | 12/2020 | Ensworth |
| 11,053,652 B2 | 7/2021 | Christiansen |
| 11,096,341 B2 | 8/2021 | Nickerson |
| 11,109,546 B2 | 9/2021 | Weiler |
| 11,163,274 B2 | 11/2021 | Ersavas |
| 11,185,023 B2 | 11/2021 | Lorenz |
| 11,229,168 B2 | 1/2022 | Woytowitz |
| 11,234,380 B2 | 2/2022 | Micu |
| 11,330,770 B2 | 5/2022 | Crist |
| 11,337,385 B2 | 5/2022 | Crist |
| 11,357,181 B2 | 6/2022 | Nickerson |
| 11,793,129 B2 * | 10/2023 | Micu ................. G05B 19/0423 |
| 2002/0002425 A1 | 1/2002 | Dossey |
| 2002/0091452 A1 | 7/2002 | Addink |
| 2003/0179102 A1 | 9/2003 | Barnes |
| 2004/0013468 A1 | 1/2004 | Kadner |
| 2004/0177983 A1 | 9/2004 | Gianfranco |
| 2006/0080002 A1 | 4/2006 | Williams |
| 2007/0088462 A1 | 4/2007 | Peleg |
| 2007/0130274 A1 | 6/2007 | Lee |
| 2008/0039978 A1 | 2/2008 | Graham |
| 2008/0046131 A1 | 2/2008 | Sarver |
| 2008/0091764 A1 | 4/2008 | Sutardja |
| 2008/0140262 A1 | 6/2008 | Williams |
| 2008/0157995 A1 | 7/2008 | Crist |
| 2008/0280586 A1 | 11/2008 | Den Ouden |
| 2009/0008472 A1 | 1/2009 | Wilson |
| 2009/0099701 A1 | 4/2009 | Li |
| 2009/0138132 A1 | 5/2009 | Collins |
| 2011/0015800 A1 | 1/2011 | Crist |
| 2011/0049260 A1 | 3/2011 | Palmer |
| 2011/0077785 A1 | 3/2011 | Nickerson |
| 2011/0137473 A1 | 6/2011 | Williams |
| 2011/0170239 A1 | 7/2011 | Nelson |
| 2011/0190947 A1 | 8/2011 | Savelle |
| 2011/0238227 A1 | 9/2011 | Hern |
| 2012/0089259 A1 | 4/2012 | Williams |
| 2012/0175425 A1 | 7/2012 | Evers |
| 2012/0261487 A1 | 10/2012 | Palmer |
| 2012/0273704 A1 | 11/2012 | O'Connor |
| 2012/0326837 A1 | 12/2012 | Ajay |
| 2013/0099022 A9 | 4/2013 | Palmer |
| 2013/0158724 A1 | 6/2013 | Nickerson |
| 2013/0253714 A1 | 9/2013 | Williams |
| 2014/0005843 A1 | 1/2014 | Thomas |
| 2014/0081469 A1 | 3/2014 | Kah, Jr. |
| 2014/0129039 A1 | 5/2014 | Olive-Chahinian |
| 2014/0222223 A1 | 8/2014 | Horton |
| 2014/0249684 A1 | 9/2014 | Nickerson |
| 2014/0354427 A1 | 12/2014 | Rapaport |
| 2015/0005960 A1 | 1/2015 | Endrizzi |
| 2015/0019031 A1 | 1/2015 | Crist |
| 2015/0045973 A1 | 2/2015 | Marsters |
| 2015/0088323 A1 | 3/2015 | Edwards |
| 2015/0112494 A1 | 4/2015 | Woytowitz |
| 2015/0115052 A1 | 4/2015 | Lehmann |
| 2015/0147119 A1 | 5/2015 | Christiansen |
| 2015/0230417 A1 | 8/2015 | Nickerson |
| 2015/0230418 A1 | 8/2015 | Woytowitz |
| 2015/0245568 A1 | 9/2015 | O'Brien |
| 2015/0268670 A1 | 9/2015 | Nies |
| 2015/0309496 A1 | 10/2015 | Kah, III |
| 2015/0327449 A1 | 11/2015 | Bartlett |
| 2015/0340143 A1 | 11/2015 | Edwards |
| 2015/0351338 A1 | 12/2015 | Redmond |
| 2016/0027600 A1 | 1/2016 | Woytowitz |
| 2016/0034416 A1 | 2/2016 | Chavez |
| 2016/0037736 A1 | 2/2016 | Rainone |
| 2016/0048135 A1 | 2/2016 | Hill |
| 2016/0050860 A1 | 2/2016 | Standerfer |
| 2016/0113219 A1 | 4/2016 | Tennyson |
| 2016/0113220 A1 | 4/2016 | Walker |
| 2016/0135390 A1 | 5/2016 | Nickerson |
| 2016/0164575 A1 | 6/2016 | Smith |
| 2016/0165817 A1 | 6/2016 | Bermudez Rodriguez |
| 2016/0175858 A1 | 6/2016 | Bell |
| 2016/0235020 A1 | 8/2016 | Nickerson |
| 2016/0259309 A1 | 9/2016 | Bangalore |
| 2016/0349765 A1 | 12/2016 | Woytowitz |
| 2016/0353678 A1 | 12/2016 | Marsters |
| 2017/0006787 A1 | 1/2017 | Weiler |

(56) References Cited

U.S. PATENT DOCUMENTS

| | | |
|---|---|---|
| 2017/0038497 A1 | 2/2017 | Hern |
| 2017/0055433 A1 | 3/2017 | Jamison |
| 2017/0065999 A1 | 3/2017 | Wright, III |
| 2017/0090448 A1 | 3/2017 | Nickerson |
| 2017/0094918 A1 | 4/2017 | Crist |
| 2017/0105369 A1 | 4/2017 | Shamley |
| 2017/0112079 A1 | 4/2017 | Eyring |
| 2017/0115672 A1 | 4/2017 | Gutierrez |
| 2017/0118929 A1 | 5/2017 | Pearson |
| 2017/0118930 A1 | 5/2017 | Bangalore |
| 2017/0156274 A1 | 6/2017 | Carlson |
| 2017/0167630 A1 | 6/2017 | Ferrer Herrera |
| 2017/0170979 A1 | 6/2017 | Khalid |
| 2017/0191695 A1 | 7/2017 | Bruhn |
| 2017/0223911 A1 | 8/2017 | Lorenz |
| 2017/0238484 A1 | 8/2017 | Arumugam |
| 2017/0258019 A1 | 9/2017 | Ferrer Herrera |
| 2017/0311159 A1 | 10/2017 | Tulliano |
| 2017/0318761 A1 | 11/2017 | Rainone |
| 2017/0322527 A1 | 11/2017 | Ersavas |
| 2017/0367277 A1 | 12/2017 | Mohindra |
| 2018/0007847 A1 | 1/2018 | Raj |
| 2018/0014480 A1 | 1/2018 | Montgomery |
| 2018/0024538 A1 | 1/2018 | Benson |
| 2018/0027071 A1 | 1/2018 | Toepke |
| 2018/0039243 A1 | 2/2018 | Bangalore |
| 2018/0042188 A1 | 2/2018 | Khabbaz |
| 2018/0077880 A1 | 3/2018 | Stange |
| 2018/0084741 A1 | 3/2018 | Gilliam |
| 2018/0139912 A1 | 5/2018 | Halahan |
| 2018/0144413 A1 | 5/2018 | Rupp |
| 2018/0161791 A1 | 6/2018 | Lichte |
| 2018/0164762 A1 | 6/2018 | Mewes |
| 2018/0168119 A1 | 6/2018 | Hartfelder |
| 2018/0199525 A1 | 7/2018 | Cline |
| 2018/0228098 A1 | 8/2018 | Nickerson |
| 2018/0228099 A1 | 8/2018 | Nickerson |
| 2018/0231143 A1 | 8/2018 | Ferrer Herrera |
| 2018/0242537 A1 | 8/2018 | Marsters |
| 2018/0295796 A1 | 10/2018 | Woytowitz |
| 2018/0303049 A1 | 10/2018 | Weiler |
| 2018/0307253 A1 | 10/2018 | Weiler |
| 2018/0310495 A1 | 11/2018 | Weiler |
| 2018/0314223 A1 | 11/2018 | Nickerson |
| 2018/0332784 A1 | 11/2018 | Crist |
| 2018/0338436 A1 | 11/2018 | Crist |
| 2019/0032294 A1 | 1/2019 | Christiansen |
| 2019/0105679 A1 | 4/2019 | Lemkin |
| 2019/0110415 A1 | 4/2019 | Walker |
| 2019/0116743 A1 | 4/2019 | Ensworth |
| 2019/0124858 A1 | 5/2019 | Sarver |
| 2019/0141919 A1 | 5/2019 | Kundra |
| 2019/0148925 A1 | 5/2019 | Pignato |
| 2019/0150380 A1 | 5/2019 | Kremicki |
| 2019/0150381 A1 | 5/2019 | Tennyson |
| 2019/0200548 A1 | 7/2019 | Standerfer |
| 2019/0224402 A1 | 7/2019 | Henry |
| 2019/0242494 A1 | 8/2019 | Ferrer Herrera |
| 2019/0261555 A1 | 8/2019 | Baldwin |
| 2019/0261584 A1 | 8/2019 | Olive-Chahinian |
| 2019/0261585 A1 | 8/2019 | Weiler |
| 2019/0270111 A1 | 9/2019 | Wright, III |
| 2019/0275551 A1 | 9/2019 | Renquist |
| 2019/0278004 A1 | 9/2019 | Hern |
| 2019/0385057 A1 | 12/2019 | Litichever |
| 2020/0127869 A1 | 4/2020 | Spanjers |
| 2022/0023894 A1 | 1/2022 | Wright, III |
| 2022/0154847 A1 | 5/2022 | Nøhr Christiansen |
| 2022/0361426 A1 | 11/2022 | Nickerson |

OTHER PUBLICATIONS

U.S. Appl. No. 16/586,729; Office Action mailed Apr. 13, 2021 (pp. 1-11).

U.S. Appl. No. 16/586,729; Notice of Allowance Sep. 9, 2021; (pp. 1-5).

U.S. Appl. No. 17/549,446; Non-Final Rejection mailed Sep. 28, 2022; (pp. 1-10).

U.S. Appl. No. 17/549,446; Notice of Allowance and Fees Due (PTOL-85) mailed Jun. 20, 2023; (pp. 1-6).

* cited by examiner

IRRIGATION CONTROLLER WITH RELAYS

CROSS-REFERENCE TO RELATED APPLICATION(S)

This application is a continuation of U.S. application Ser. No. 17/549,446 filed Dec. 13, 2021, now U.S. Pat. No. 11,793,129, which claims the benefit of U.S. application Ser. No. 16/586,729 filed Sep. 27, 2019, now U.S. Pat. No. 11,234,380, which claims the benefit of U.S. Provisional Application No. 62/737,382 filed Sep. 27, 2018, all of which are incorporated herein by reference in their entirety.

TECHNICAL FIELD

This invention relates generally to irrigation controllers and more specifically to irrigation controllers that control decoder-based irrigation control units.

BACKGROUND

Many types of irrigation systems enable automated irrigation of plant life. With some plant life and/or in some geographic regions irrigating can be costly. In a typical decoder-based irrigation controller having a two-wire output path that transmits power and is modulated with data to address and control decoder-based irrigation control units in the field, expandability of a coverage area to be irrigated is limited by the number of decoder-based irrigation control units that could be coupled to the single two-wire connection out of the irrigation controller. Accordingly, a customer may be forced to purchase an additional irrigation controller to control additional decoder-based irrigation control units to irrigate an expanded coverage area. Additionally, troubleshooting irrigation problems may become a time consuming and expensive ordeal.

BRIEF DESCRIPTION OF THE DRAWINGS

Disclosed herein are embodiments of systems, apparatuses and methods pertaining to controlling irrigation. This description includes drawings, wherein.

Figure 1:
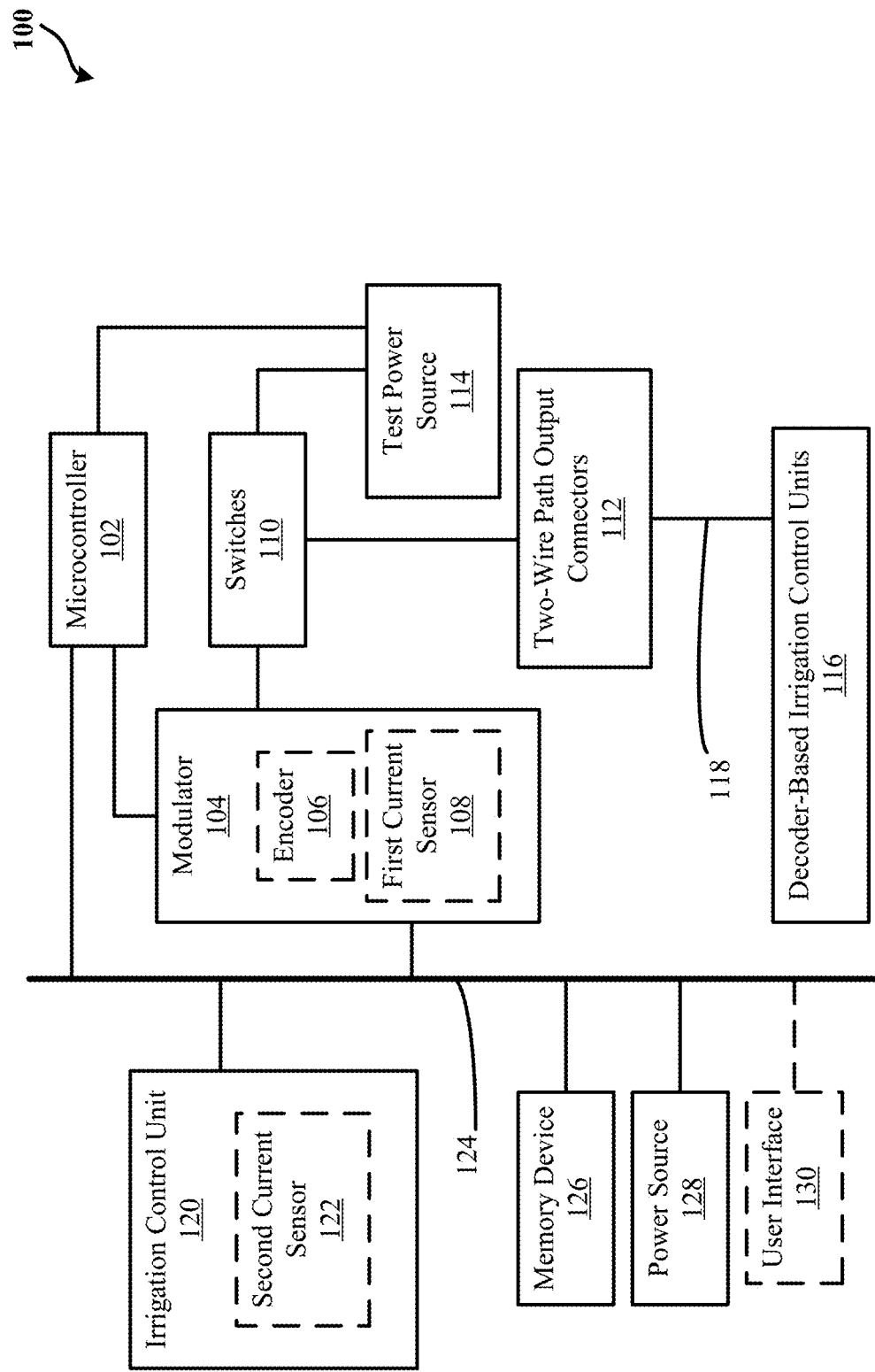
FIG. 1 illustrates a simplified block diagram of an exemplary irrigation control system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to in controlling irrigation and troubleshooting irrigation problems. In some embodiments, an irrigation control system includes an irrigation controller including an irrigation control unit configured to store and execute an irrigation schedule. In some configurations, the irrigation controller may include a microcontroller coupled to the irrigation control unit and configured to receive the instructions from the irrigation control unit. By one approach, the irrigation controller may include a power source coupled with the irrigation control unit. By another approach, the irrigation controller may include a modulator coupled to the power source and the microcontroller. In some implementation, the modulator may output modulated power signals comprising operational power and data modulated based on control signals from the microcontroller. In some configurations, the irrigation controller includes a plurality of switches coupled to an output of the modulator and independently controlled by the microcontroller. By one approach, the irrigation controller may include a plurality of two-wire path output connectors each coupled to a corresponding one of the plurality of switches. In some implementation, each of the plurality of two-wire path output connectors may be connected to a corresponding two-wire path of a plurality of two-wire paths to which multiple decoder-based irrigation control units can be connected and controlled. By one approach, the decoder-based irrigation control units may receive the modulated power signals from the corresponding two-wire path. In some configurations, the microcontroller may operate the plurality of switches to couple and decouple the modulated power signals from the output of the modulator to one or more of the plurality of two-wire path output connectors.

The modulator in some embodiments may include a current sensor configured to detect a short condition in a plurality of two-wire paths. By one approach, upon detection of the short condition by the current sensor, the microcontroller may automatically execute a first series of short isolation steps. In some implementations, the short isolation steps may include operating, by the microcontroller, the plurality of switches to decouple the plurality of two-wire path output connectors from an output of the modulator. Alternatively or in addition to, the short isolation steps may include operating, by the microcontroller, each of the plurality of switches to sequentially couple each corresponding one of the plurality of two-wire path output connectors with the output of the modulator. By one approach, a subsequent two-wire path output connector of the plurality of two-wire path output connectors may be coupled to the output of the modulator after a determination by the microcontroller whether a short condition is detected at a previous two-wire path output connector of the plurality of two-wire path output connectors. In such an approach, in response to the determination that the short condition is detected at the previous two-wire path output connector, the microcontroller may decouple the previous two-wire path output connector from the output of the modulator prior to coupling the subsequent two-wire path output connector with the output of the modulator. Alternatively or in addition to, in response to the determination that the short condition is not detected at the previous two-wire path output connector, the microcontroller may determine a current measurement at the previous two-wire path output connector through the current sensor and decouple the previous two-wire path output connector from the output of the modulator prior to coupling the subsequent two-wire path output connector with the output of the modulator.

In some embodiments, the irrigation control system may include a test power source coupled to and controlled by the microcontroller and configured to output a current limited output signal useful to determine which one of multiple decoder-based irrigation control units caused a short condition. In some configurations, the plurality of switches may each independently controlled by the microcontroller to couple to an output of the modulator or to an output of the test power source. By one approach, the microcontroller may operate the plurality of switches to couple and decouple one of the modulated power signals from the output of the modulator and the current limited output signal from the testing power source to one or more of the plurality of two-wire path output connectors. In some configurations, during a diagnostic operation of the irrigation control system, the microcontroller may operate the plurality of switches to cause the modulator to stop the output of the modulated power signals and to initiate the test power source to output the current limited output signal.

In some embodiments, the irrigation control system may include a memory coupled with the irrigation control unit and configured to store associations of each two-wire path of a plurality of two-wire paths with each of a plurality of mapped decoder-based irrigation control units. In some configurations, upon a receipt of an auto-mapping instruction by the microcontroller, the microcontroller may automatically execute a series of auto-mapping steps. By one approach, the auto-mapping steps may include operating, by the microcontroller, the plurality of switches to decouple the plurality of two-wire path output connectors from the output of the modulator. Alternatively or in addition to, the auto-mapping steps may include operating, by the microcontroller, each of the plurality of switches to sequentially couple each corresponding one of the plurality of two-wire path output connectors with the output of the modulator to determine which one of the plurality of two-wire paths is coupled to one or more unmapped decoder-based irrigation control units. In some implementations, coupling of a subsequent two-wire path output connector of the plurality of two-wire path output connectors with the output of the modulator may be based on a subsequent determination by the microcontroller whether each one of one or more identifiers associated with the one or more unmapped decoder-based irrigation control units is associated with one or more two-wire paths of the plurality of two-wire paths.

To illustrate, FIGS. 1 through 6 are described below. FIG. 1 illustrates a simplified block diagram of an exemplary irrigation control system 100 in accordance with some embodiments. The system 100 includes an irrigation controller. By one approach, the irrigation controller includes an irrigation control unit 120, a microcontroller 102, a modulator 104, and a plurality of switches 110. In some embodiments, the system 100 may include a single microcontroller (not shown) configured to implement the functionality of both the microcontroller 102 and the modulator 104 as described herein. In some other embodiments, functionalities of the irrigation control unit 120, the microcontroller 102, and the modulator 104 may be implemented in a control circuit or a processor (not shown) of the irrigation controller of the system 100. In one example, the irrigation control unit 120 may include microprocessor, another microcontroller, and a control circuit configured to control electronic components, and/or process and execute instructions, and/or the like.

By one approach, the irrigation control unit 120 may be coupled to the microcontroller 102 and/or the modulator 104 via a communication bus 124. The communication bus 124 may include at least one of a backplane, a wired and/or wireless communication link, a communication network, and/or other types of devices, systems, or methods for electrical components, cables, wires, connectors and/or computer electronics or devices to communicate with one another. In some configurations, the system 100 may include a memory 126, a user interface 130, and/or a power source 128 coupled to the irrigation control unit 120 via the communication bus 124. By one approach, the irrigation controller may include the memory 126. Alternatively or in addition to, another memory 126 may be separate from the irrigation controller. The memory 126 may include storage devices (e.g., hard disk, flash drives, portable hard drives, cloud storage, solid stage drives, and the like), a random access memory (RAM), a read only memory (ROM), and/or the like. In one configuration, the irrigation controller may include the power source 128 coupled with the irrigation control unit 120 and/or the microcontroller 102 and configured to provide power to one or more components/devices/elements in the system 100. In one example, the power source 128 may include alternating current power supply. In another example, the power source 128 may include a transformer, a converter, a battery, and/or the like. By another approach, the irrigation controller may include the user interface 130. In some embodiments, the user interface is implemented in a control panel or portion of the irrigation controller and may include one or more of buttons, slide switches, dials, touch sensitive areas, display screens, lights, etc. Alternatively or in addition to, another user interface 130 may be separate from the irrigation controller of the system 100. By one approach, a user interface 130 may be remote from and communicatively coupled to the irrigation controller via Internet and/or local or wide area wireless network or short range wireless communication standard (e.g., WiFi, Bluetooth, near field communications). In one example, the remote user interface 130 may include a smartphone, iPad, laptop, tablet, and/or other types of portable electronic devices configured to communicate with the irrigation controller of the system 100 and/or the irrigation control unit 120.

In one configuration, the system 100 may include a test power source 114 coupled to and controlled by the microcontroller 102. In another configuration, the plurality of switches 110 may be coupled to the test power source 114. The plurality of switches 110 may be embodied in a variety of forms, such as relays, triacs, solid state switches, etc. By one approach, the plurality of switches 110 may be coupled to a plurality of two-wire path output connectors 112. For example, each of the plurality of switches 110 is coupled to a corresponding one of the plurality of two-wire path output connectors 112. In one scenario, each of the plurality of two-wire path output connectors 112 may be coupled to a respective one or more decoder-based irrigation control units 116 and/or a respective set of the decoder-based irrigation control units 116 via a corresponding one of a plurality of two-wire paths 118. In an illustrative non-limiting example, whenever a first decoder-based irrigation control unit of the decoder-based irrigation control units 116 is associated with a two-wire path of the plurality of two-wire paths 118, the first decoder-based irrigation control unit may not be associated with another two-wire path of the plurality of two-wire paths 118. In another illustrative non-limiting example, each two-wire path of the plurality of two-wire paths 118 may include a respective set of the multiple decoder-based irrigation control units.

Figure 2:
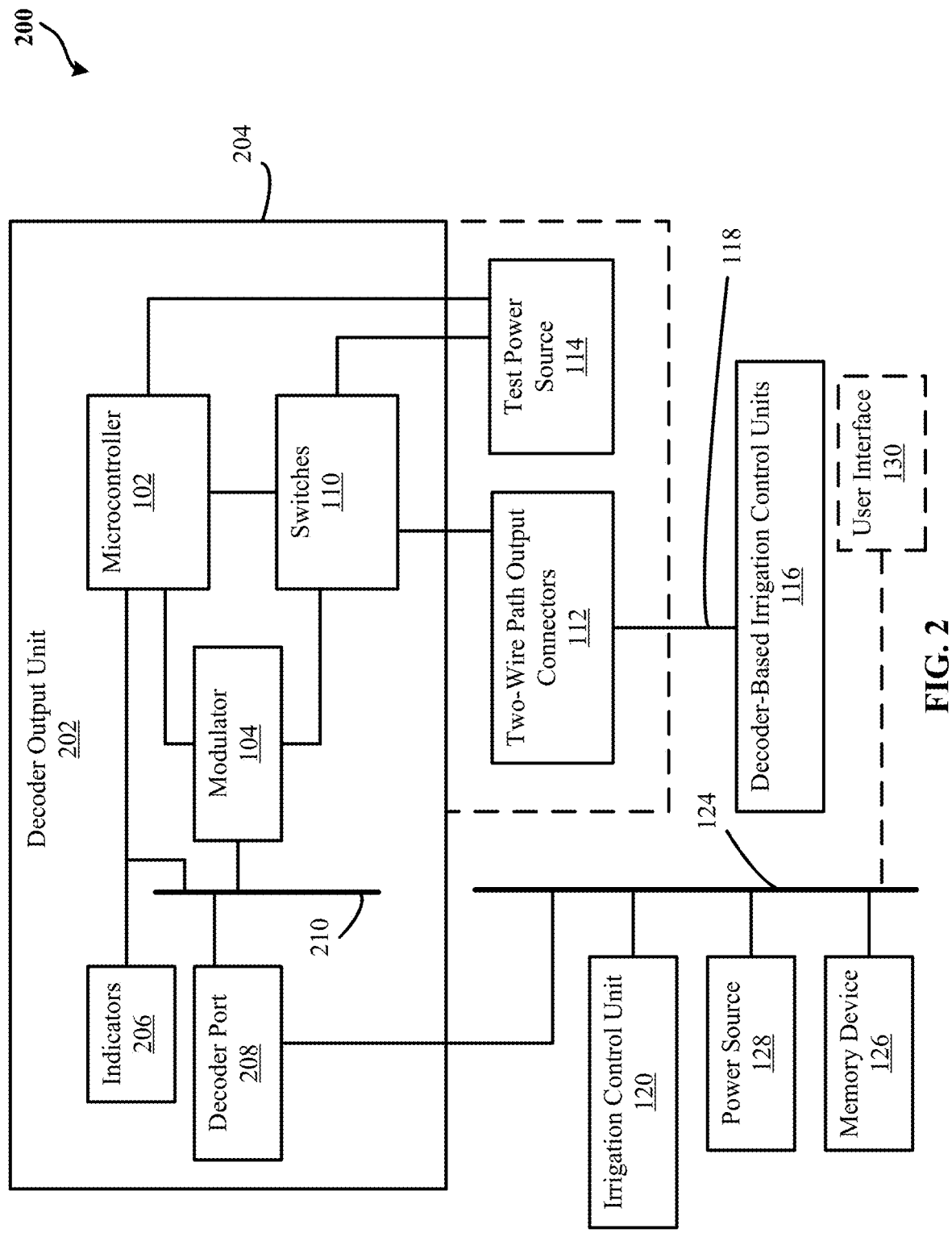
FIG. 2 illustrates a simplified block diagram of an exemplary irrigation control system with a detachable decoder output unit in accordance with some embodiments.

FIG. 2 illustrates a simplified block diagram of an exemplary irrigation control system 200 with a detachable decoder output unit 202 in accordance with some embodiments. By one approach, the decoder output unit 202 may include a housing 204 and a decoder port 208. In such an approach, the microcontroller 102, the modulator 104, and the plurality of switches 110 may be enclosed within the housing 204. In one configuration, the microcontroller 102, the modulator 104, and the plurality of switches 110 may couple to the irrigation control unit 120 via the decoder port 208 that is detachably coupled to the communication bus 124 (e.g., backplane) of an irrigation controller of the system 200. In such configuration, the microcontroller 102, the modulator 104, and/or the plurality of switches 110 may communicate with one another via a local communication bus 210 of the decoder output unit 202. By one approach, the power source 128 may provide power to the microcontroller 102 via the communication bus 124 (e.g., backplane) of the system 200 through the decoder port 208. In some embodiments, the test power source 114 and/or the plurality of two-wire path output connectors 112 may be enclosed in the housing 204. Alternatively, the test power source 114 and/or the plurality of two-wire path output connectors 112 may be separate from the decoder output unit 202. In one example, the decoder port 208 may include commercially available card connectors and socket connectors configured to couple and decouple with a corresponding backplane connector coupled to the backplane of the irrigation controller of system 200.

Figure 3:
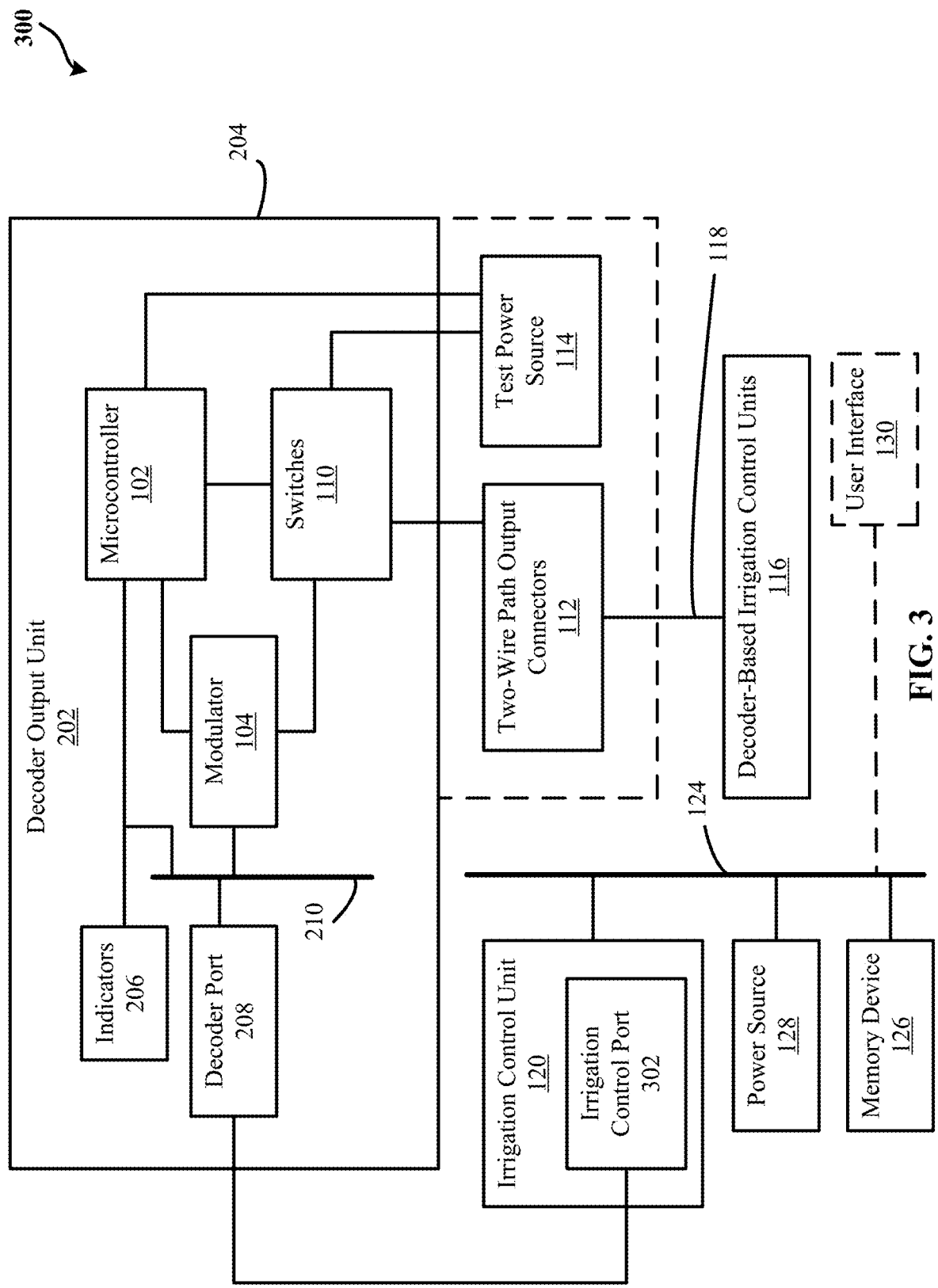
FIG. 3 illustrates another simplified block diagram of an exemplary irrigation control system with a detachable decoder output unit in accordance with some embodiments.

FIG. 3 illustrates another simplified block diagram of an exemplary irrigation control system 300 with a detachable decoder output unit 202 in accordance with some embodiments. By one approach, the irrigation control unit 120 may include an irrigation control port 302. In such an approach, the decoder port 208 of the decoder output unit 202 of the system 300 may detachably couple to the irrigation control port 302. As such, the irrigation control unit 120 may communicate with the microcontroller 102 and/or the modulator 104 via the irrigation control port 302 through the decoder port 208. In one example, the decoder port 208 may include commercially available connectors configured to directly couple and decouple with a corresponding connector mate (i.e., the irrigation control port 302) of the irrigation control unit 120 of system 300. In another example, the decoder port 208 may include commercially available connectors configured to detachably couple with a first end of a cable while a second end of the cable is configured to detachably couple with a commercially available connectors of the irrigation control port 302 of the irrigation control unit 120 of system 300. For example, the decoder port 208 and the irrigation control port 302 may be in accordance with at least one of the IEEE connector standards (e.g., IEEE 1394 standards or the like). In yet another example, the decoder port 208 may be wirelessly coupled to the irrigation control port 302. For example, the decoder port 208 and the irrigation control port 302 may be in accordance with at least one of the IEEE wireless standards. By one approach, the difference between the system 200 of FIG. 2 and the system 300 of FIG. 3 is namely on the way the decoder output unit 202 is coupled to the irrigation control unit 120. In FIG. 2, the decoder port 208 is detachably coupled to the irrigation control unit 120 via the backplane (i.e., the communication bus 124). In FIG. 3, the decoder port 208 is detachably coupled to the irrigation control unit 120 via the irrigation control port 302. Alternatively, the irrigation control system 100 of FIG. 1 may be configured to have both types of coupling with the irrigation control unit 120, as described in FIGS. 2 and 3.

In some embodiments, a plurality of indicators 206 are coupled to the housing 204 of FIGS. 2 and 3. Each of the plurality of indicators 206 is associated with a respective one of the plurality of two-wire paths 118. In some embodiments, the indicators 206 illuminate to indicate the connection status associated with each of the plurality of two-wire path output connectors by visually inspecting the housing 204 without the need to navigate menus and displays of the user interface 130, e.g., the indicators 206 may also be referred as status indicators. In one configuration, the plurality of indicators 206 may be disposed on a portion of a surface of the housing 204 to be easily viewed by a user. By another approach, each of the plurality of indicators 206 may be electrically disposed between a corresponding switch of the plurality of switches 110 and a corresponding one of the plurality of two-wire path output connectors 112. By another approach, each of the plurality of indicators 206 may be electrically disposed between the corresponding one of the plurality of two-wire path output connectors 112 and a first one in a series of a respective set of the decoder-based irrigation control units 116. As such, an open or a cut anywhere on a portion of a two-wire path between a corresponding switch of the plurality of switches 110 and a respective first decoder-based irrigation control unit of the decoder-based irrigation control units 116 may cause a corresponding indicator of the indicators 206 to indicate that there is an open or a cut/break between the corresponding switch and the respective first decoder-based irrigation control unit. For example, when there is an open or a cut between the corresponding switch and the respective first decoder-based irrigation control unit, the corresponding indicator either illuminate, de-illuminate, or start flashing to indicate that there is an open or a cut/break.

The following descriptions, illustrations, examples, and/or explanations of components/elements of an irrigation control system are applicable to the components/elements shown in the irrigation control systems illustrated in FIGS. 1-3.

By one approach, the irrigation control unit 120 may store and/or execute one or more irrigation schedules. The irrigation schedule may define the irrigation of controlled devices and may be program-based and/or zone-based. The irrigation schedules can store one or more automatically defined or user defined parameters such as start times, watering days, watering frequency (e.g., per watering day), seasonal adjustments, other weather, sensor or evapotranspiration (ET) based adjustments, non-watering periods, and watering restrictions, etc. for irrigating plant life in one or more irrigation areas. In one configuration, the power source 128 may provide power to the microcontroller 102 and/or the modulator 104. For example, the power source 128 may include an alternating current (A/C) power supply. In one scenario, the A/C power supply may correspond to a 26.5 volts A/C. In one implementation, the modulator 104 may include an encoder 106. By one approach, the modulator 104 via the encoder 106, in cooperation with the microcontroller 102, may modulate power signals received from the power source 128 to output modulated power signals including operational power and data modulated based on control signals received from the microcontroller 102. The modulator 104 can use any modulation techniques, such as amplitude clipping, pulse width modulation, etc. In one configuration, the control signals may be based on instructions received by the microcontroller 102 from the irrigation control unit 120. In one example, the instructions may be associated with, due to, and/or in accordance with the execution of the irrigation schedule by the irrigation control unit 120. By one approach, the memory 126 may store a plurality of irrigation schedules based on one or more user inputs and/or programming of the irrigation controller by a user via the user interface 130. In some embodiments, the modulator 104 may comprise a single modulator that outputs identical modulated power signals to each switch of the plurality of switches 110.

By another approach, each one of the plurality of switches 110 is independently controlled by the microcontroller 102. In one example, the plurality of switches 110 (also interchangeably referred to as relays) may include solid state relays (SSRs) (e.g., reed relay coupled SSR, transformer coupled SSR, photo-coupled SSR, among other type of SSRs that are commercially available). In one configuration, one or more of the plurality of switches 110 may be coupled to an output of the modulator 104. In another configuration, one or more of the plurality of switches 110 may be coupled to the test power source 114. As such, if an irrigation control system is operating with no issues, problems, or the like (e.g., short, open electrical connections, failed decoder-based irrigation control units 116, valves, etc.), each of the plurality of switches 110 may be coupled to the output of the modulator 104. However, in one example, if an irrigation control system may be operating with issues, problems, or the like, one or more of the plurality of switches 110 may be decoupled from the output of the modulator 104 and coupled instead with the test power source 114. In such example, the one or more of the plurality of switches 110 may be coupled with the test power source 114 but the test power source 114 is not activated or in operation. By one approach, the test power source 114 may only be activated by the microcontroller 102 during a diagnostic operation of an irrigation controller. As such, during a normal operation of the irrigation controller, the modulated power signals may only be output to/through those two-wire path output connectors 112 that have their corresponding switches 110 coupled to the output of the modulator 104. Thus, the irrigation control system may include multiple decoder-based irrigation control units 116 that are coupled to and controlled by the microcontroller 102 to activate a plurality of valves to irrigate one or more irrigation areas. With regards to those switches 110 that are decoupled from the output of the modulator 104 but coupled to the test power source 114, no modulated power signals are output to their corresponding switches 110. Thus, those decoder-based irrigation control units 116 that are respectively associated with the switches 110 that are decoupled from the output of the modulator 104 but coupled to the test power source 114 are not activated; thereby, no irrigation are performed in the corresponding irrigation areas.

In some embodiments, the irrigation control system and/or the irrigation controller may include a plurality of two-wire path output connectors 112 that are each coupled to a corresponding one of the plurality of switches 110. By one approach, each of the plurality of two-wire path output connectors 112 may be connected to a corresponding two-wire path of a plurality of two-wire paths 118 to which multiple decoder-based irrigation control units 116 can be connected and controlled. In one configuration, each two-wire path of the plurality of two-wire paths 118 is associated with a respective one or more of the decoder-based irrigation control units 116. For example, a first decoder-based irrigation control unit of the decoder-based irrigation control units 116 may be associated with a first two-wire path of the plurality of two-wire paths 118. In such an example, other ones of the plurality of two-wire paths 118 may not be associated with the first decoder-based irrigation control unit. Thus, in such an example, the memory 126 may only store an association of a decoder-based irrigation control unit 116 with one particular two-wire path 118. By one approach, each of the plurality of two-wire paths 118 may only be associated with one particular set of the decoder-based irrigation control units 116. Alternatively or in addition to, each of the plurality of two-wire path output connectors 112 may be associated with one particular set of the decoder-based irrigation control units 116. In one implementation, the memory 126 may store a plurality of associations of each two-wire path of a plurality of two-wire paths with a respective one or a respective set of a plurality of mapped decoder-based irrigation control units.

In one configuration, the decoder-based irrigation control units 116 may receive modulated power signals from/through the corresponding two-wire path. In one example, the microcontroller 102 may operate the plurality of switches 110 to couple and decouple the modulated power signals from an output of the modulator 104 to one or more of the plurality of two-wire path output connectors 112. As such, the corresponding ones of the plurality of two-wire paths 118 that are coupled with the corresponding ones of the plurality of two-wire path output connectors 112 may receive the same modulated power signals output from the modulator 104 whenever the corresponding ones of the plurality of switches 110 couple the corresponding ones of the plurality of two-wire path output connectors 112 with the output of the modulator 104. By one approach, the microcontroller 102 may independently operate each of the plurality of switches 110 based on instructions received from the irrigation control unit 120. In one scenario, when the irrigation control system is operating normally (e.g., no issues, problems, or the like), each one of the plurality of switches 110 may be coupled with an output of the microcontroller 102. In such scenario, the microcontroller 102 may determine that since each one of the plurality of switches 110 are coupled with the output of the microcontroller 102, no control signals needed to provide to the plurality of switches 110. In other scenario, if the irrigation control system experiences issues, problems, or the like, the microcontroller 102 may provide one or more control signals to the plurality of switches 110 to determine which one of the plurality of switches 110 to switch over connection or coupling from the output of the microcontroller 102 to the test power source 114. Thus, an irrigation control system including the plurality of switches 110 enables the irrigation control system to still perform irrigation to areas that are not affected by the issue/problem by independently and automatically cutting off the modulated power signals only to those decoder-based irrigation control units 116 that are affected by the issue/problem while keeping those unaffected decoder-based irrigation control units 116 in operation. Additionally, through the use of the plurality of switches 110, the irrigation control system is able increase the number of decoder-based irrigation control units 116 supported by a single irrigation controller.

Figure 7:
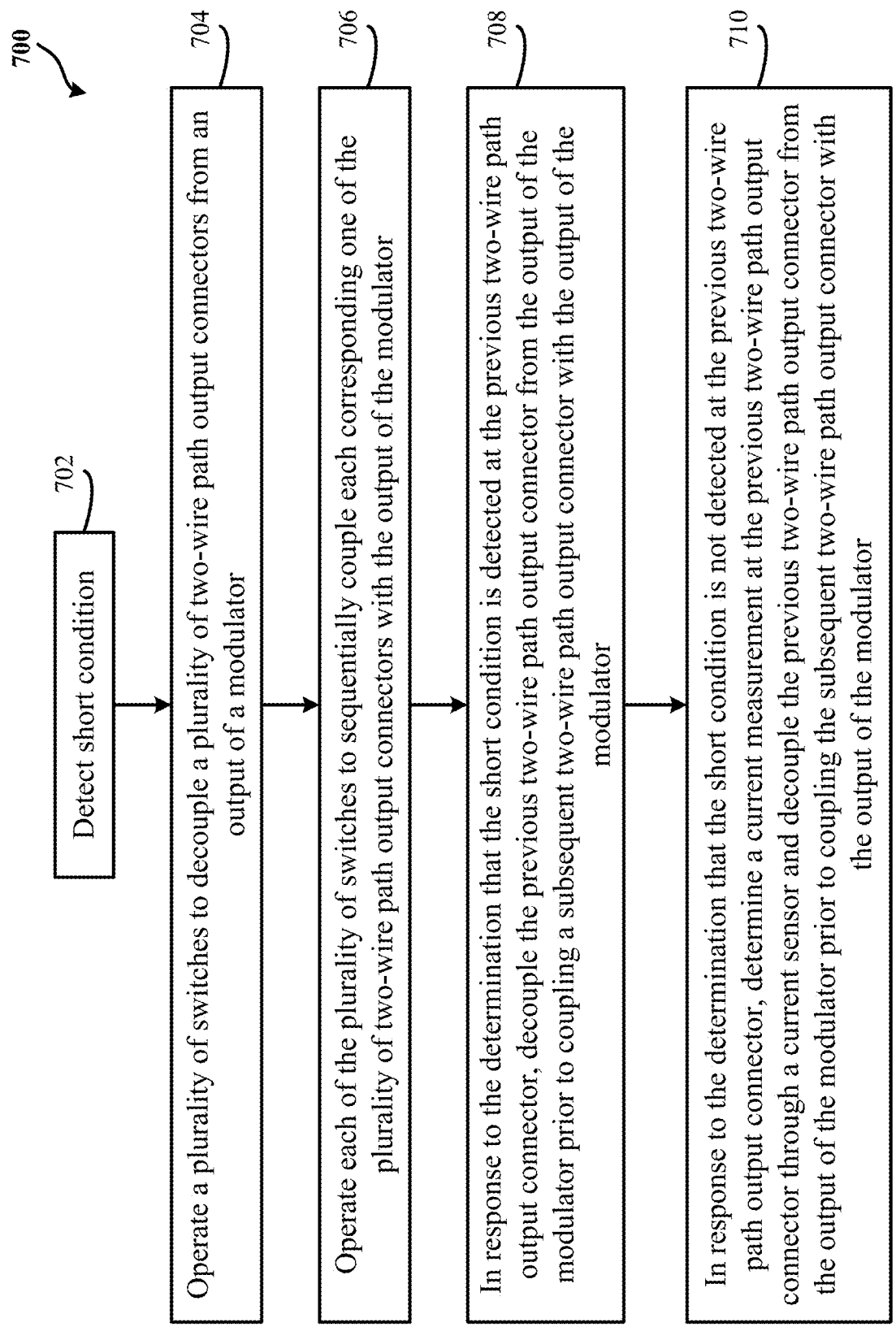
FIG. 7 shows a flow diagram of an exemplary process of automatically isolating and/or determining short condition by an exemplary irrigation control system in accordance with some embodiments.

In some embodiments, an irrigation control system including the plurality of switches 110 may be configured to automatically execute a first series of short isolation steps whenever an electrical short is detected in one or more of the plurality of two-wire paths 118. FIG. 7 shows a flow diagram of an exemplary process (e.g., method 700) of isolating and/or determining short condition by an exemplary irrigation control system in accordance with some embodiments. In an illustrative non-limiting example and cooperatively illustrated by the method 700 FIG. 7, the modulator 104 may include, at step 702, a first current sensor 108 that detects a short condition in the plurality of two-wire paths 118. By one approach, the first current sensor 108 may comprise a circuitry configured to detect an electrical short condition (e.g., a condition that causes an excessive pull of current or a condition that allows a current to travel along a path with no or very low electrical impedance). By one approach, upon detection of a short condition by the first current sensor 108, the microcontroller 102 may automatically execute a first series of short isolation steps to determine and isolate one or more two-wire paths of the plurality of two-wire paths 118 that are associated with the short condition. In one configuration, the first series of short isolation steps may include, at step 704, operating, by the microcontroller 102, the plurality of switches 110 to decouple the plurality of two-wire path output connectors 112 from an output of the modulator 104. Alternatively or in addition to, the first series of short isolation steps may include, at step 706, operating, by the microcontroller 102, each of the plurality of switches 110 to sequentially couple each corresponding one of the plurality of two-wire path output connectors 112 with the output of the modulator 104. By one approach, a subsequent two-wire path output connector of the plurality of two-wire path output connectors 112 may be coupled to the output of the modulator 104, by the microcontroller 102 via an operation (e.g., switching) of a corresponding one of the plurality of switches 110, after a determination by the microcontroller 102 whether a short condition is detected at a previous two-wire path output connector of the plurality of two-wire path output connectors 112. Alternatively or in addition to, the first series of short isolation steps may include, at step 708, in response to the determination that the short condition is detected at the previous two-wire path output connector, decoupling, by the microcontroller 102, the previous two-wire path output connector from the output of the modulator 104 prior to coupling the subsequent two-wire path output connector with the output of the modulator 104. Alternatively or in addition to, the first series of short isolation steps may include, at step 710, in response to the determination that the short condition is not detected at the previous two-wire path output connector, determine, by the microcontroller 102, a current measurement at the previous two-wire path output connector through the first current sensor 108 and decouple the previous two-wire path output connector from the output of the modulator 104 prior to coupling the subsequent two-wire path output connector with the output of the modulator 104.

Figure 4:
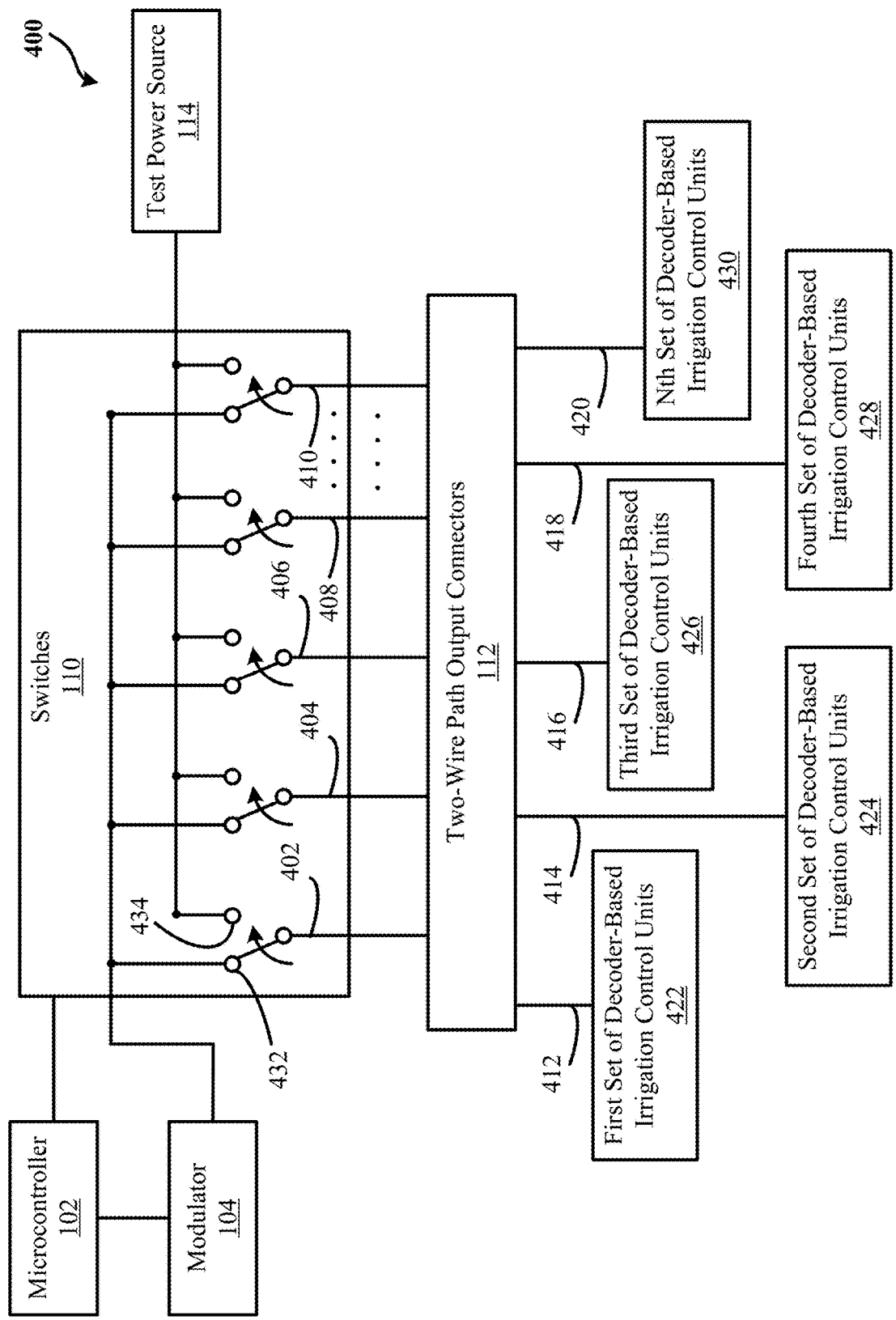
FIG. 4 illustrates a simplified block diagram of an irrigation control system including an exemplary switches in accordance with some embodiments.
Figure 5:
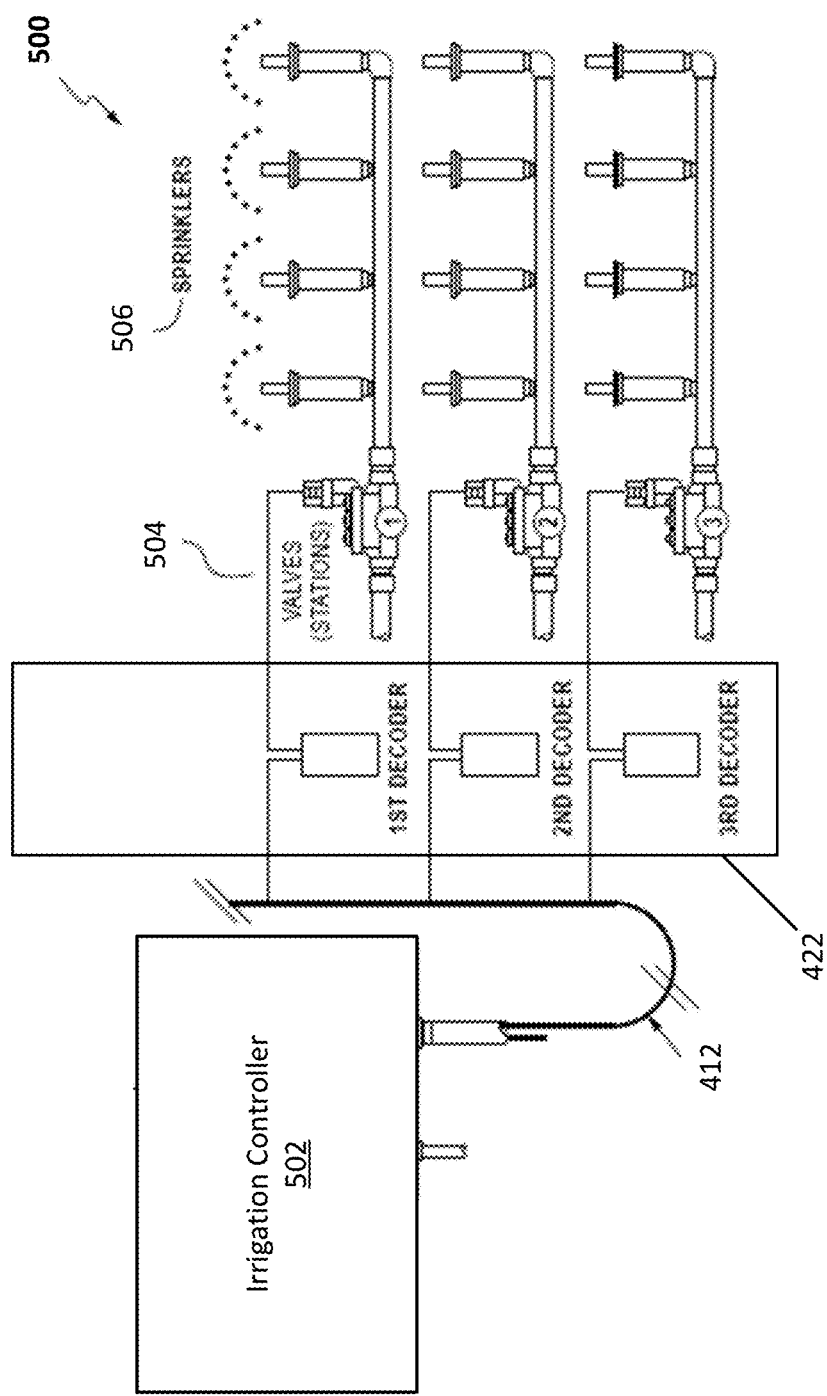
FIG. 5 is a schematic illustration of an exemplary irrigation control system in accordance with some embodiments.

To illustrate, FIGS. 4 and 5 are described below. FIG. 4 illustrates a simplified block diagram of an irrigation control system 400 including an exemplary switches 110 in accordance with some embodiments. By one approach, the irrigation control system 400 may correspond to the irrigation control system 100 of FIG. 1, the irrigation control system 200 of FIG. 2, and/or the irrigation control system 300 of FIG. 3. In an illustrative non-limiting example, the plurality of switches 110 may include a first switch 402, a second switch 404, a third switch 406, a fourth switch 408, and an Nth switch 410. In one configuration, the plurality of switches 110 may include solid state relays (SSRs) and/or any circuit having one or more electrical components and/or devices configured to operate and/or function as relays/switches. Each switches of the plurality of switches 110 may have a corresponding first and second connection nodes each serving as a coupling node to either an output of the modulator 104 or an output of the test power source 114. For example, the first switch 402 may include a first connection node 432 and a second connection node 434. By one approach, the first connection node 432 may be a coupling node used to provide continuity or electrical path between the output of the modulator 104 and a corresponding one of the plurality of two-wire path output connectors 112 and/or a first two-wire path 412 of the plurality of two-wire paths 118. By another approach, the second connection node 434 may be a coupling node used to provide continuity or electrical path between the output of the test power source 114 and the corresponding one of the plurality of two-wire path output connectors 112 and/or the first two-wire path 412. In another example, the second switch 404 may include a second corresponding first and second connection nodes that provide continuity or electrical path either between the output of the modulator 104 and a second corresponding one of the plurality of two-wire path output connectors 112 and/or a second two-wire path 414 of the plurality of two-wire paths 118 or between the output of the test power source 114 and the second corresponding one of the plurality of two-wire path output connectors 112 and/or the second two-wire path 414. In another example, the third switch 406 may include a third corresponding first and second connection nodes that provide continuity or electrical path either between the output of the modulator 104 and a third corresponding one of the plurality of two-wire path output connectors 112 and/or a third two-wire path 416 of the plurality of two-wire paths 118 or between the output of the test power source 114 and the third corresponding one of the plurality of two-wire path output connectors 112 and/or the third two-wire path 416. In another example, the fourth switch 408 may include a fourth corresponding first and second connection nodes that provide continuity or electrical path either between the output of the modulator 104 and a fourth corresponding one of the plurality of two-wire path output connectors 112 and/or a fourth two-wire path 418 of the plurality of two-wire paths 118 or between the output of the test power source 114 and the fourth corresponding one of the plurality of two-wire path output connectors 112 and/or the fourth two-wire path 418. In yet another example, the Nth switch 410 may include an Nth corresponding first and second connection nodes that provide continuity or electrical path either between the output of the modulator 104 and an Nth corresponding one of the plurality of two-wire path output connectors 112 and/or an Nth two-wire path 420 of the plurality of two-wire paths 118 or between the output of the test power source 114 and the Nth corresponding one of the plurality of two-wire path output connectors 112 and/or the Nth two-wire path 420.

By one approach, each of the plurality of two-wire paths 118 may be associated with a corresponding one of the decoder-based irrigation control units 116. In an illustrative non-limiting example, the first two-wire path 412 may be associated with a first set of decoder-based irrigation control units 422. In another example, the second two-wire path 414 may be associated with a second set of decoder-based irrigation control units 424. In another example, the third two-wire path 416 may be associated with a third set of decoder-based irrigation control units 426. In another example, the fourth two-wire path 418 may be associated with a fourth set of decoder-based irrigation control units 428. In yet another example, the Nth two-wire path 420 may be associated with an Nth set of decoder-based irrigation control units 430.

In some implementations, one or more of the plurality of two-wire path output connectors 112 may be coupled to one or more of the plurality of two-wire paths 118 that are coupled to and/or associated with one or more of the decoder-based irrigation control units 116. To illustrate, FIG. 5 is a schematic illustration of an exemplary irrigation control system 500 in accordance with some embodiments. In some embodiments, the irrigation control system 500 includes an irrigation controller 502. By one approach, the irrigation controller 502 may correspond to the irrigation controller of the irrigation control system 100 of FIG. 1, the irrigation controller of the irrigation control system 200 of FIG. 2, the irrigation controller of the irrigation control system 300 of FIG. 3, and/or the irrigation controller of the irrigation control system 400 of FIG. 4. In illustrative non-limiting example, the first two-wire path 412 may be coupled to and/or associated with the first set of decoder-based irrigation control units 422. In one example, the first set of decoder-based irrigation control units 422 may include a first decoder, a second decoder, and a third decoder. In another example, each of the decoders of the first set of decoder-based irrigation control units 422 may be coupled to one or more valves (or stations) 504 that are each associated with one or more sprinklers 506.

In another illustrative non-limiting example of determining and/or isolating one or more two-wire paths of the plurality of two-wire path output connectors 112 that may have caused the first current sensor 108 to detect a short condition. By one approach, when the first current sensor 108 detects, at a first time, that a short condition has occurred, the microcontroller 102 operates on the plurality of switches 110 to decouple an output of the modulator 104 from the plurality of two-wire path output connectors 112. For example, the first switch 402 may be operated on by the microcontroller 102 to switch coupling from the first connection node 432 to the second connection node 434. As such, the supply of the modulated power signals to the first set of decoder-based irrigation control units 422 is cut off. Therefore, the first, second, and third decoders of the first set of decoder-based irrigation control units 422 are deactivated and the irrigation of a corresponding irrigation area is halted when an irrigation schedule is currently in operation during the short condition.

In one configuration, the microcontroller 102 may provide a first control signal to the first switch 402 to couple, at a second time, the corresponding two-wire path output connector with the output of the modulator 104; thereby, coupling the first two-wire path 412 with the output of the modulator 104. By one approach, the microcontroller 102 may then determine whether the first current sensor 108 detects a short condition. In one scenario, when the microcontroller 102 determines that the first current sensor 108 has detected the short condition, the microcontroller 102 may provide a second control signal to the first switch 402 to decouple, at a third time, the output of the modulator 104 from the corresponding two-wire path output connector. In another scenario, when the microcontroller 102 determines that the first current sensor 108 has not detected a short condition, the microcontroller 102 may determine a current measurement at the corresponding two-wire path output connector through the first current sensor 108. By one approach, the microcontroller 102 may initiate storage of the current measurement at the memory device 126 and/or a memory device associated with the modulator 104 and/or the microcontroller 102.

Alternatively or in addition to, the microcontroller 102 may decouple the corresponding two-wire path output connector from the output of the modulator 104 prior to coupling the second corresponding two-wire path output connector (e.g., a subsequent two-wire path output connector associated with the second two-wire path 414) with the output of the modulator 104. In one configuration, the microcontroller 102 may provide a third control signal to the second switch 404 to couple, at a fourth time, the second corresponding two-wire path output connector with the output of the modulator 104 to determine whether the first current sensor 108 detects a short condition. As such, the microcontroller 102 may sequentially determine whether the first current sensor 108 detects a short condition in each re-coupling of the corresponding one of the plurality of two-wire path output connectors 112 with the output of the modulator 104. In one scenario where the first current sensor 108 detects a short condition, the microcontroller 102 may decouple back the corresponding one of the plurality of two-wire path output connectors 112 from the output of the modulator 104 and then move on to a subsequent switch of the plurality of switches 110 to operate on and determine whether a short condition is detected. In another scenario where the first current sensor 108 does not detect a short condition, the microcontroller 102 may determine a current measurement at the previous two-wire path output connector and decouple the previous two-wire path output connector from the output of the modulator 104 prior to coupling the subsequent two-wire path output connector with the output of the modulator 104. In one configuration, the first current sensor 108 may obtain a current measurement at and each time a two-wire path output connector is coupled to the output of the modulator 104. In such a configuration, the microcontroller 102 may initiate storage of the current measurement and associate the stored current measurement with the corresponding two-wire path output connector that the microcontroller 102 had taken the current measurement from.

In some embodiments, the first series of short isolation steps execute by the microcontroller 102 may further include determining which of the current measurement determined at each of the plurality of two-wire path output connectors is a highest current measurement in response to decoupling a final two-wire path output connector of the plurality of two-wire path output connectors 112 from the output of the modulator 104 and in response to not detecting the short condition at any of the plurality of two-wire path output connectors 112. For example, the microcontroller 102 may initially decouple the plurality of two-wire paths 118 from the output of the modulator 104. By one approach, the microcontroller 102 may sequentially couple each of the plurality of two-wire path output connectors 112 to the output of the modulator 104 at a time. In one configuration, prior to coupling a next two-wire path output connector to the modulator 104, the microcontroller 102 may determine whether a short condition is detected at a two-wire path output connector currently coupled to the modulator 104. By one approach, when the short condition is not detected, the microcontroller 102 may determine a current measurement at and/or along an electrical path coupled to the two-wire path output connector currently coupled to the modulator 104 and/or subsequently decouple the two-wire path output connector currently coupled to the modulator 104 prior to coupling the next two-wire path output connector to the modulator 104. By another approach, when the short condition is detected, the microcontroller 102 may decouple the two-wire path output connector currently coupled to the modulator 104 prior to coupling the next two-wire path output connector to the modulator 104. In one implementation, the microcontroller 102 may repeat the previously described steps on each of the plurality of two-wire path output connectors 112. In such an implementation, proximate the end of the first series of short isolation steps, the plurality of two-wire path output connectors 112 may be decoupled from the output of the modulator 104. By one approach, the microcontroller 102 may leave a particular two-wire path output connector of the plurality of two-wire path output connectors 112 associated with the highest current measurement decoupled from the output of the modulator 104. For example, the microcontroller 102 may couple the remaining two-wire path output connectors of the plurality of two-wire path output connectors 112 with the output of the modulator 104. In such an example, the decoder-based irrigation control units 116 associated with the particular two-wire path output connector is inoperable during an operation of the irrigation control system. Thus, the microcontroller 102 may determine whether a short condition is detected at and/or along an electrical path coupled to each of the plurality of two-wire path output connectors 112. However, upon a determination that the short condition is not detected over anyone of the plurality of two-wire path output connectors 112, microcontroller 102 may decouple the particular two-wire path output connector having the highest measured current. As such, the microcontroller 102 may subsequently couple the remaining the two-wire path output connector. In one configuration, the microcontroller 102 may repeat the previously described steps until the first current sensor 108 no longer detects a short condition. As such, upon a second detection of the short condition by the first current sensor 108 at a second time, the microcontroller 102 may automatically execute a second series of short isolation steps including repeating the first series of short isolation steps to the remaining two-wire path output connectors until the short condition is no longer detected by the first current sensor 108.

Thus, at the end of the first series of short isolation steps, one or more two-wire path output connectors of the plurality of two-wire path output connectors 112 may be decoupled from the output of the modulator 104; thereby, rendering the corresponding set of the decoder-based irrigation control units 116 deactivated until the short condition is resolved or fixed. In some embodiments, from time to time, the microcontroller 102 may re-execute the series of short isolation steps to determine whether, after a passage of time, a short condition no longer exist or detected. By one approach, the irrigation control unit 120 and/or the irrigation control system may send a notification to the user interface 130 indicating that a short condition has been detected. In one configuration, the notification may include which one of the plurality of two-wire paths 118 has been decoupled from the output of the modulator 104. Alternatively or in addition to, the notification may include which one of the decoder-based irrigation control units 116 has been affected and/or deactivated by the microcontroller 102. Thus, an irrigation control system including the plurality of switches 110 enable an irrigation controller to still execute an irrigation schedule and activate those unaffected decoder-based irrigation control units 116 to irrigate the corresponding unaffected irrigation area while only deactivating those affected decoder-based irrigation control units 116.

In some embodiments, the test power source 114 may output a current limited output signal useful to determine which one of multiple decoder-based irrigation control units 116 caused a short condition. In one configuration, the current limited output signal may include a current detectable by a commercially available clamp meters and/or the like. By one approach, the microcontroller 102 may provide a control signal to the test power source 114 to initiate operation. In one example, the control signal may be based on and in response to a first user input through the user interface 130. In another example, the irrigation control unit 120 may temporarily halt execution of an irrigation schedule when the test power source 114 is initiated to operate. In yet another example, the irrigation schedule may be restarted based on a second user input through the user interface 130. In such an example, the microcontroller 102 may provide a second control signal to the test power source 114 to stop outputting the current limited output signal to those decoder-based irrigation control units 116 that are coupled to the test power source 114 via those plurality of switches 110 decoupled from the output of the microcontroller 102 but coupled to the output of the test power source 114. By one approach, the first and second user inputs may be via one or more user interfaces 130. For example, the first user inputs may be received by the irrigation control unit 120 through a user interface 130 integrated with, in close proximity with, or directly coupled to an irrigation controller including the irrigation control unit 120 while the second user input and/or subsequent user input may be received by the irrigation control unit 120 through a user interface 130 (e.g., smartphone, tablet, and/or the like) remote from and wirelessly coupled to the irrigation controller and/or the irrigation control unit 120.

Figure 8:
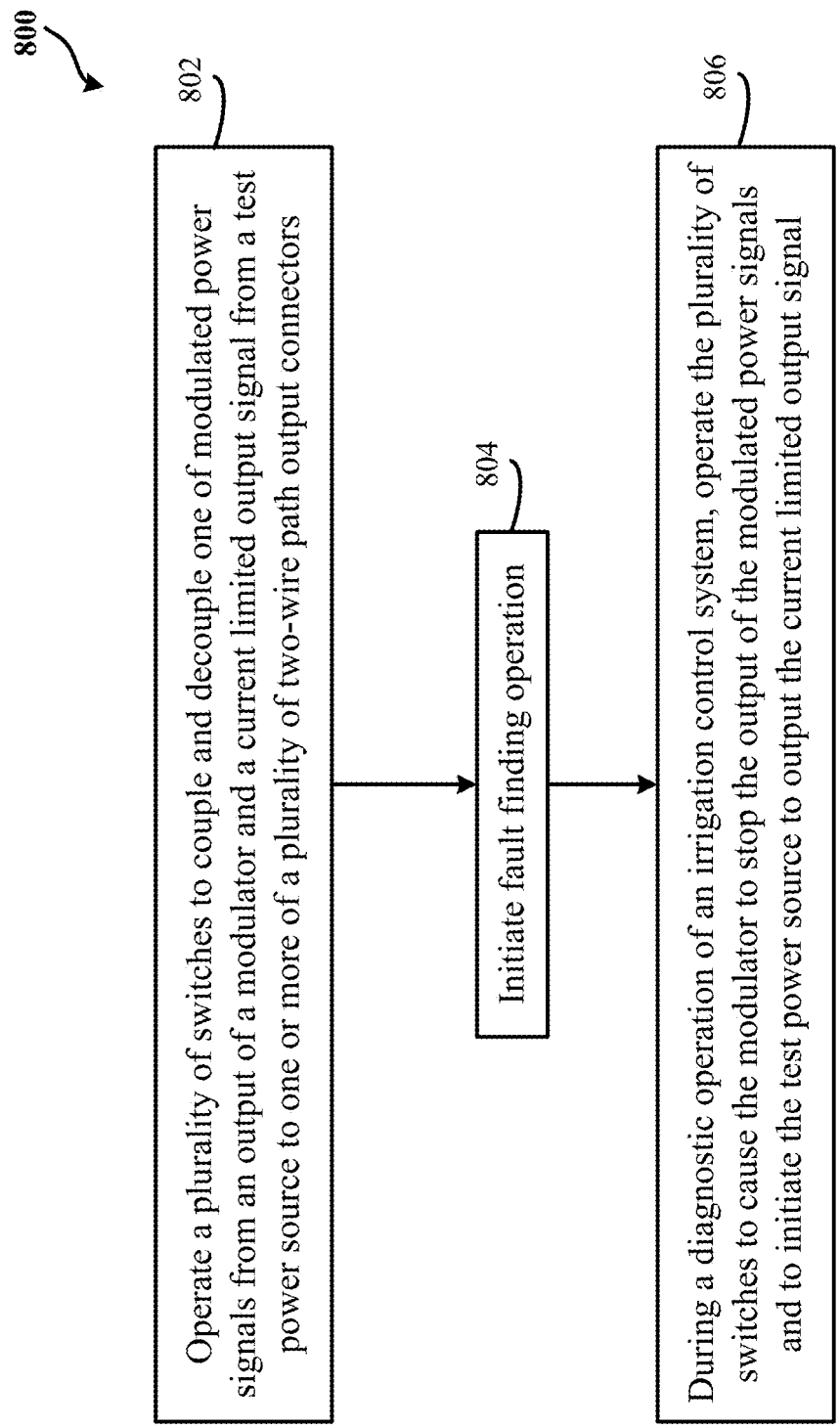
FIG. 8 shows a flow diagram of an exemplary process of fault-finding operation by an exemplary irrigation control system in accordance with some embodiments.

In one implementation, to determine which one of the multiple decoder-based irrigation control units 116 caused a short condition detected by the irrigation control system, the microcontroller 102 may operate the plurality of switches 110 to couple and decouple one of the modulated power signals from the output of the modulator 104 and the current limited output signal from the test power source 114 to one or more of the plurality of two-wire path output connectors 112. FIG. 8 shows a flow diagram of an exemplary process (e.g., method 800) of a fault-finding operation by an exemplary irrigation control system in accordance with some embodiment. In an illustrative non-limiting example and cooperatively illustrated by the method 800 FIG. 8, a fault-finding operation of the irrigation control system (e.g., the determination of which one of the multiple decoder-based irrigation control units 116 caused the short condition) may be initiated (automatically and/or by a user input), at step 804, some period of time subsequent to the determination and/or isolation of the one or more two-wire paths of the plurality of two-wire path output connectors 112 that may have caused the first current sensor 108 to detect the short condition as previously described. In one example, prior to a start of a diagnostic operation of the irrigation control system, at least one of the plurality of switches 110 may couple the output of the modulator 104 with a first corresponding one of the plurality of two-wire path output connectors 112 and at least another one of the plurality of switches 110 may couple the test power source 114 with a second corresponding one of the plurality of two-wire path output connectors 112. In another example, during the diagnostic operation of the irrigation control system, the microcontroller 102 may operate each of the plurality of switches 110 to sequentially couple each corresponding one of the plurality of two-wire path output connectors 112 with the output of the test power source 114 to determine which of the multiple decoder-based irrigation control units 116 associated with the corresponding one of the plurality of two-wire path output connectors 112 is causing at least one of: a short condition and an open condition at the corresponding one of the plurality of two-wire path output connectors 112. In yet another example, prior to a start of the diagnostic operation of the irrigation control system, one or more first switches of the plurality of switches 110 may couple the output of the modulator 104 with one or more first two-wire path output connectors of the plurality of two-wire path output connectors 112 and one or more second switches of the plurality of switches 110 may couple the test power source 114 with one or more second two-wire path output connectors of the plurality of two-wire path output connectors 112.

To illustrate, prior to the start of the fault-finding operation, the microcontroller 102, via operation of the first switch 402, may have decoupled the first two-wire path 412 from the output of the modulator 104 and coupled the first two-wire path 412 instead with the output of the test power source 114 after a determination by the microcontroller 102 and/or the irrigation control unit 120 that a fault condition is detected (while the second two-wire path 414, the third two-wire path 416, the fourth two-wire path 418, and the Nth two-wire path 420 remained coupled with the output of the modulator 104, at step 802. As such, during a diagnostic operation (e.g., the fault-finding operation) of the irrigation control system, the microcontroller 102 may operate the plurality of switches 110 to cause the modulator 104 to stop the output of the modulated power signals to some of the plurality of two-wire paths 118 and to initiate the test power source to output the current limited output signal instead, at step 806.

For example, a short condition may have been detected by the first current sensor 108 over the first two-wire path 412. By one approach, during a diagnostic operation of the irrigation control system (e.g., the fault-finding operation), the current limited output signal may flow from the test power source 114 through the first two-wire path 412 via the first switch 402 and the corresponding one of the plurality of two-wire path output connectors 112. In one configuration, the current limited output signal may continuously flow through decoders of the first set of decoder-based irrigation control units 422 coupled to the first two-wire path 412. In one example, the current limited output signal may not be detected after the third decoder of the decoders of the first set of decoder-based irrigation control units 422 in FIG. 5. In such an example, a user may determine that a fault condition detected by the microcontroller 102 and/or the irrigation control unit 120 may be have been caused by a short in the third decoder and/or a break in the first two-wire path 412 between the third decoder and the second decoder of the first set of decoder-based irrigation control units 422 in FIG. 5. By one approach, after the identification and/or resolution of the cause of the fault condition, the user may provide a user input via the user interface 130 to cause the irrigation control unit 120 to reinitiate and/or continue execution of the irrigation schedule. Alternatively or in addition to, during the diagnostic operation of the irrigation control system, the second current sensor 122 of the irrigation control unit 120 may detect the fault condition instead of the first current sensor 108. For example, the second current sensor 122 may detect that a short condition still exists in the first two-wire path 412 and/or at the corresponding two-wire path output connector of the plurality of two-wire path output connectors 112. In response, the irrigation control unit 120 may send notification and/or alert to the user interface 130 to indicate that the short condition still exists. As such, an irrigation control system including the plurality of switches 110 in cooperation with the test power source 114 may facilitate identification of where in the plurality of two-wire paths 118 the fault condition, for example the short condition, occurred.

In some embodiments, prior to a start of the diagnostic operation of the irrigation control system, some of the two-wire path output connectors may already be decoupled from the output of the modulator 104. For example, the irrigation control system may have previously executed the automatic short isolation process/steps to determine the cause of short condition. Thus, at the end of the automatic short isolation process/steps, the microcontroller 102 may have operated on one or more corresponding switches of the plurality of switches 110 to decouple those two-wire path output connectors determined to cause the short condition from the output of the modulator 104. For example, during the diagnostic operation of the irrigation control system, the microcontroller 102 may operate the one or more second switches to decouple the one or more second two-wire path output connectors from the output of the test power source 114 and subsequently couple the one or more second two-wire path output connectors with the modulator 104 prior to the initiation of the test power source 114 to output the current limited output signal and subsequent to the modulator 104 stopping the output of the modulated power signals. By one approach, the microcontroller 102 may sequentially operate each of the one or more second switches to couple each corresponding one of the one or more second two-wire path output connectors with the output of the test power source 114 in response to the initiation of the test power source 114 to output the current limited output signal to determine which of the multiple decoder-based irrigation control units 116 associated with the corresponding one of the one or more second two-wire path output connectors is causing at least one of: a short condition and an open condition at the corresponding one of the one or more second two-wire path output connectors. In such an approach, a previously coupled one of the one or more second two-wire path output connectors may be decoupled from the output of the test power source 114 prior to coupling a subsequent one of the one or more second two-wire path output connectors with the output of the test power source 114.

Figure 9:
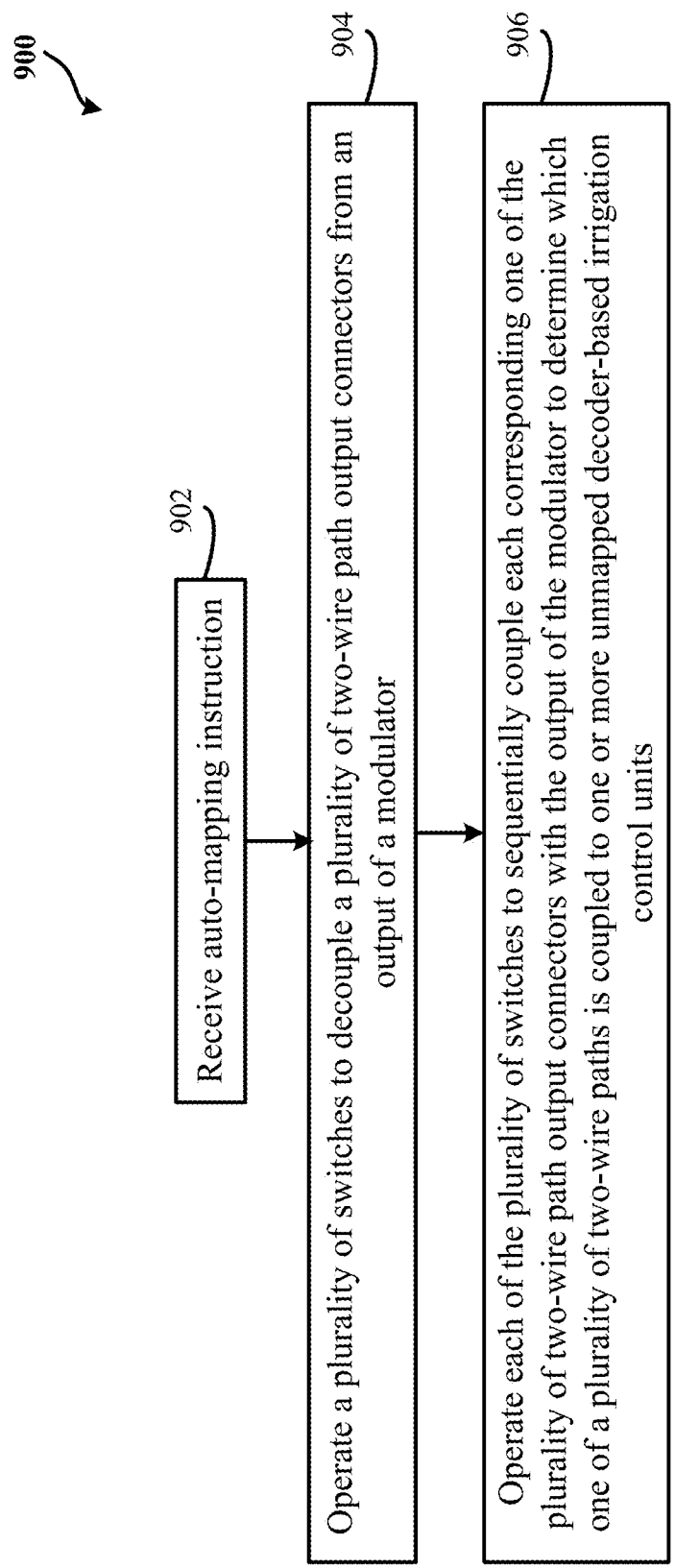
FIG. 9 shows a flow diagram of an exemplary process of automatically mapping decoder-based irrigation control units by an exemplary irrigation control system in accordance with some embodiments.

In some embodiments, a diagnostic operation may include a fault-finding operation, a short condition determination and/or isolation, and/or automatic mapping of the decoder-based irrigation control units 116. FIG. 9 shows a flow diagram of an exemplary process (e.g., method 900) of automatically mapping decoder-based irrigation control units by an irrigation control system in accordance with some embodiments. By one approach, the automatic mapping of the decoder-based irrigation control units 116 may be initiated based on a user input through the user interface 130. Alternatively or in addition to, the automatic mapping of the decoder-based irrigation control units 116 may be initiated based on a detection by the irrigation control system that an unmapped decoder-based irrigation control unit is detected over the plurality of two-wire paths 118. In one configuration, upon a receipt of an auto-mapping instruction by the microcontroller 102 from the irrigation control unit 120, the microcontroller 102 may automatically execute a series of auto-mapping steps, at step 902. By one approach, the auto-mapping steps may include operating, by the microcontroller 102, the plurality of switches 110 to decouple the plurality of two-wire path output connectors 112 from the output of the modulator 104, at step 904. Alternatively or in addition to, operating, by the microcontroller 102, each of the plurality of switches 110 to sequentially couple each corresponding one of the plurality of two-wire path output connectors 112 with the output of the modulator 104 to determine which of one of the plurality of two-wire paths is coupled to one or more unmapped decoder-based irrigation control units, at step 906. In some embodiments, coupling of a subsequent two-wire path output connector of the plurality of two-wire path output connectors 112 with the output of the modulator 104 may be based on a subsequent determination by the microcontroller 102 whether each one of one or more identifiers associated with the one or more unmapped decoder-based irrigation control units is associated with one or more two-wire paths of the plurality of two-wire paths 118. For example, the microcontroller 102 may send queries for each of the unmapped decoder-based irrigation control units to a currently coupled two-wire path prior to subsequently sending the same queries for each of the unmapped decoder-based irrigation control units to a subsequently coupled two-wire path. Thus, the microcontroller 102 may execute the same queries to each of the two-wire paths 118 regardless of whether the unmapped decoder-based irrigation control units were previously mapped to one or more previously coupled two-wire paths. In another example, the microcontroller 102 may only send queries to a subsequently coupled two-wire path for those unmapped decoder-based irrigation control units that were not previously mapped to one or more previously coupled two-wire paths.

In one implementation, the series of auto-mapping steps executed by the microcontroller 102 may further include, in response to the determination that at least one of the one or more identifiers is not associated with at least one of the one or more two-wire paths, operate a first switch of the plurality of switches 110 to decouple a previous two-wire path output connector of the plurality of two-wire path output connectors 112 from the output of the modulator 104. Alternatively or in addition to, the series of auto-mapping steps executed by the microcontroller 102 may further include operating a second switch of the plurality of switches 110 to couple the subsequent two-wire path output connector with the output of the modulator 104. By one approach, the microcontroller 102 may send a first query signal to the subsequent two-wire path output connector. For example, the first query signal may include a first identifier of the one or more identifiers associated with a first unmapped decoder-based irrigation control unit of the one or more unmapped decoder-based irrigation control units. Alternatively or in addition to, the series of auto-mapping steps executed by the microcontroller 102 may further include determining whether a response signal is received through the subsequent two-wire path output connector. By one approach, the microcontroller 102 may, in response to the determination that the response signal is received, associate the first identifier with a first two-wire path of the one or more two-wire paths associated with the subsequent two-wire path output connector. Alternatively or in addition to, the series of auto-mapping steps executed by the microcontroller 102 may further include initiating the memory 126 to store the association of the first identifier with the first two-wire path. By one approach, the microcontroller 102 may, in response to the determination that the response signal is not received, send a second query signal to the subsequent two-wire path output connector. For example, the second query signal may include a second identifier of the one or more identifiers associated with a second unmapped decoder-based irrigation control unit of the one or more unmapped decoder-based irrigation control units.

In some embodiments, the series of auto-mapping steps executed by the microcontroller 102 may further include, in response to a subsequent determination that at least one of the one or more identifiers is not associated with at least one of the one or more two-wire paths, operating the second switch to decouple the subsequent two-wire path output connector from the output of the modulator 104. By one approach, the microcontroller 102 may operate a third switch of the plurality of switches 110 to couple a next subsequent two-wire path output connector of the plurality of two-wire path output connectors 112 with the output of the modulator 104. Alternatively or in addition to, the microcontroller 102 may send the first query signal to the next subsequent two-wire path output connector. For example, the first identifier associated with the first query signal may be previously associated with the first two-wire path associated with the subsequent two-wire path output connector. Alternatively or in addition to, the microcontroller 102 may determine whether the response signal is received through the next subsequent two-wire path output connector. By one approach, the microcontroller 102 may, in response to the determination that the response signal is not received, send the second query signal to the next subsequent two-wire path output connector.

In other embodiments, the series of auto-mapping steps executed by the microcontroller 102 may further include, in response to a subsequent determination that at least one of the one or more identifiers is not associated with at least one of the one or more two-wire paths, operating the second switch to decouple the subsequent two-wire path output connector from the output of the modulator 104. By one approach, the microcontroller 102 may operate a third switch of the plurality of switches 110 to couple a next subsequent two-wire path output connector of the plurality of two-wire path output connectors 112 with the output of the modulator 104. Alternatively or in addition to, the microcontroller 102 may send a next query signal to the next subsequent two-wire path output connector. For example, the next query signal may include a next identifier of the one or more identifiers associated with a next unmapped decoder-based irrigation control unit of the one or more unmapped decoder-based irrigation control units. In such an example, the next identifier may not have been previously associated with a previous two-wire path of the one or more two-wire paths associated with a previous two-wire path output connector and the first two-wire path of the one or more two-wire paths associated with the subsequent two-wire path output connector.

In some embodiments, the microcontroller 102 may automatically associate a remaining unmapped decoder-based irrigation control unit with the last two-wire path of the plurality of two-wire paths 118 when the last two-wire path is the only remaining two-wire path that the microcontroller 102 has not sent queries to. For example, the series of auto-mapping steps executed by the microcontroller 102 may further include, in response to a subsequent determination that at least one of the one or more identifiers is not associated with a second one to a last one of the one or more two-wire paths, associating one or more remaining identifiers of the one or more identifiers with the last one of the one or more two-wire paths. Alternatively or in addition to, the microcontroller 102 may initiate the memory 126 (at times previously identified herein as the memory device 126) to store the association of the one or more remaining identifiers with the last one of the one or more two-wire paths.

In one configuration, the microcontroller 102 may, in response to the subsequent determination that each one of the one or more identifiers associated with the one or more unmapped decoder-based irrigation control units is associated with the one or more two-wire paths of the plurality of two-wire paths, operate the plurality of switches 110 to couple the plurality of two-wire path output connectors 112 with the output of the modulator 104 indicating that auto-mapping is complete.

In some embodiments, the microcontroller 102 may send a message and/or a signal to the irrigation control unit 120 when one or more of the unmapped decoder-based irrigation control units are still not mapped and/or associated with any one of the plurality of two-wire paths 118 after sending corresponding query signals to each of the plurality of two-wire paths 118 as described above. In such an embodiment, in response to sending the message and/or the signal, the microcontroller 102 may operate the plurality of switches 110 to couple the plurality of two-wire path output connectors 112 with the output of the modulator 104 indicating that auto-mapping is complete.

To illustrate, one or more elements of FIGS. 4 and 5 are used to describe an illustrative non-limiting example of an automatic mapping operation. In one example, after a fault isolation operation as previously described above, the second decoder of the first set of decoder-based irrigation control units 422 of FIG. 5 may have been identified as causing the short condition. Additionally, an Nth decoder of the Nth set of decoder-based irrigation control units 430 of FIG. 5 may also been identified as causing the short condition. Subsequent to the identifications, a user may remove the second decoder and the Nth decoder and install a first replacement decoder and a second replacement decoder, respectively, in their place. By one approach, the user may initiate the automatic mapping operation. Alternatively or in addition to, the irrigation control unit 120 may determine that two unmapped decoder-based irrigation control units are coupled to the plurality of two-wire paths 118 and may cause the initiation of the automatic mapping operation. In one configuration, based on an initiation of the automatic mapping operation, an auto-mapping instruction may be provided to the microcontroller 102. Upon the receipt of the auto-mapping instruction, the microcontroller 102 may operate on the plurality of switches 110 by causing the first switch 402, the second switch 404, the third switch 406, the fourth switch 408, and the Nth switch 410 of FIG. 4 to switched over to their corresponding second connection nodes to couple with the test power source 114. However, during the automatic mapping operation, the test power source 114 is deactivated and/or placed in inoperable state by the microcontroller 102. As such, no current limited output signal is output by the test power source 114 during the automatic mapping operation.

By one approach, the microcontroller 102 may, at a first time, operate on the Nth switch 410 to couple the corresponding two-wire path output connector associated with the Nth two-wire path 420 with the output of the modulator 104. In response, the microcontroller 102 may send a first query signal over the Nth two-wire path 420. In one example, the first query signal may include an identifier associated with the first replacement decoder or a first unmapped decoder-based irrigation control unit. By one approach, when the microcontroller 102 did not detect or received a response signal after a period of time, (e.g., a few seconds or minutes), the microcontroller 102 may send a second query signal over the Nth two-wire path 420. In one example, the second query signal may include an identifier associated with the second replacement decoder or a second unmapped decoder-based irrigation control unit. In such an example, since the second replacement decoder replaces the Nth decoder associated with the Nth two-wire path 420, the microcontroller 102 may receive a response signal. In one scenario, in response to receiving the response signal, the microcontroller 102 may associate the identifier associated with the second replacement decoder with the Nth two-wire path 420. Alternatively or in addition to, the microcontroller 102 may initiate the memory 126 to store the association of the identifier associated with the second replacement decoder with the Nth two-wire path 420.

Upon a determination that a remaining unmapped decoder-based irrigation control unit is still yet to be associated, the microcontroller 102 may operate on the Nth switch 410 to decouple the corresponding two-wire path output connector associated with the Nth two-wire path 420 from the output of the modulator 104. In response, the microcontroller 102 may, at a second time, operate on the fourth switch 408 to couple the corresponding two-wire path output connector associated with the fourth two-wire path 418 with the output of the modulator 104. Subsequently, the microcontroller 102 may send the first query signal over the fourth two-wire path 418. The first query signal may include the identifier associated with the first replacement decoder, as described above. After a period of time, when the microcontroller 102 did not detect or received a response signal, the microcontroller 102 may operate on the fourth switch 408 to decouple the corresponding two-wire path output connector associated with the fourth two-wire path 418 from the output of the modulator 104. In response, the microcontroller 102 may, at a third time, operate on the third switch 406 to couple the corresponding two-wire path output connector associated with the third two-wire path 416 with the output of the modulator 104. Subsequently, the microcontroller 102 may send the first query signal over the third two-wire path 416. After a period of time, when the microcontroller 102 did not detect or received a response signal, the microcontroller 102 may operate on the third switch 406 to decouple the corresponding two-wire path output connector associated with the third two-wire path 416 from the output of the modulator 104. In response, the microcontroller 102 may, at a fourth time, operate on the second switch 404 to couple the corresponding two-wire path output connector associated with the second two-wire path 414 with the output of the modulator 104. Subsequently, the microcontroller 102 may send the first query signal over the second two-wire path 414. After a period of time, when the microcontroller 102 did not detect or received a response signal, the microcontroller 102 may operate on the second switch 404 to decouple the corresponding two-wire path output connector associated with the second two-wire path 414 from the output of the modulator 104. In response, the microcontroller 102 may, at a fifth time, operate on the first switch 402 to couple the corresponding two-wire path output connector associated with the first two-wire path 412 with the output of the modulator 104. Subsequently, the microcontroller 102 may send the first query signal over the first two-wire path 412. In response, the microcontroller 102 may detect or receive a response signal. As such, the microcontroller 102 may associate the identifier associated with the first replacement decoder with the first two-wire path 412. By one approach, the microcontroller 102 may then initiate the memory 126 to store the association of the identifier associated with the first replacement decoder with the first two-wire path 412. In some implementation, the memory 126 may remove a previous association with an old decoder and add a new association with a replacement decoder. Alternatively, in response to not detecting or receiving a response signal after a period of time when the microcontroller 102 send the first query signal over the second two-wire path 414, the microcontroller 102 may automatically initiate the memory 126 to store the association of the identifier associated with the first replacement decoder with the first two-wire path 412 since the first two-wire path 412 is the last two-wire path of the plurality of two-wire paths 118. In one implementation, the microcontroller 102 may repeat the previously described steps with another unmapped decoder-based irrigation control units until each of the unmapped decoder-based irrigation control units are mapped to corresponding two-wire paths of the plurality of two-wire paths 118.

In other embodiments, the microcontroller 102 may determine whether a response signal may be received from a query sent separately and individually to each of the plurality of two-wire path output connectors before sending a second query associated with a next unmapped decoder-based irrigation control unit. For example, coupling of a subsequent two-wire path output connector of the plurality of two-wire path output connectors 112 with the output of the modulator 104 may be based on a subsequent determination by the microcontroller 102 whether a response signal was detected subsequent to a query signal sent by the microcontroller 102 while a previous two-wire path output connector of the plurality of two-wire path output connectors 112 is coupled with the output of the modulator 104. In one configuration, the query signal may include a first identifier associated with an unmapped decoder-based irrigation control unit.

Alternatively or in addition to, in response to the determination that the response signal was not detected, operating, by the microcontroller 102, a first switch of the plurality of switches 110 to decouple the previous two-wire path output connector from the output of the modulator 104. Alternatively or in addition to, operating, by the microcontroller 102, a second switch of plurality of switches 110 to couple the subsequent two-wire path output connector with the output of the modulator 104 to determine whether the response signal is received when the query signal is sent at this time. Alternatively or in addition to, in response to the determination that the response signal is detected, associating, by the microcontroller 102, the first identifier with a first two-wire path of the plurality of two-wire paths 118 corresponding with the previous two-wire path output connector. Alternatively or in addition to, initiating, by the microcontroller 102, the memory 126 to store the association of the first identifier with the first two-wire path.

To illustrate, one or more elements of FIGS. 4 and 5 are used to describe another illustrative non-limiting example of an automatic mapping operation. In one example, after a fault isolation operation as previously described above, the second decoder of the first set of decoder-based irrigation control units 422 of FIG. 5 may have been identified as causing the short condition. Subsequent to the identification, a user may remove the second decoder and install a replacement decoder in its place. By one approach, the user may initiate the automatic mapping operation. Alternatively or in addition to, the irrigation control unit 120 may determine that an unmapped decoder-based irrigation control unit is coupled to the plurality of two-wire paths 118 and may cause the initiation of the automatic mapping operation. In one configuration, based on an initiation of the automatic mapping operation, an auto-mapping instruction may be provided to the microcontroller 102. Upon the receipt of the auto-mapping instruction, the microcontroller 102 may operate on the plurality of switches 110 by causing the first switch 402, the second switch 404, the third switch 406, the fourth switch 408, and the Nth switch 410 of FIG. 4 to switched over to their corresponding second connection nodes to couple with the test power source 114. However, during the automatic mapping operation, the test power source 114 is deactivated and/or placed in inoperable state by the microcontroller 102. As such, no current limited output signal is output by the test power source 114 during the automatic mapping operation. By one approach, the microcontroller 102 may, at a first time, operate on the Nth switch 410 to couple the corresponding two-wire path output connector associated with the Nth two-wire path 420 with the output of the modulator 104. In response, the microcontroller 102 may send a query signal over the Nth two-wire path 420. In one example, the query signal may include an identifier associated with the replacement decoder or the unmapped decoder-based irrigation control unit. By one approach, when the microcontroller 102 did not detect or received a response signal after a period of time, (e.g., a few seconds or minutes), the microcontroller 102 may operate on the Nth switch 410 to decouple the corresponding two-wire path output connector associated with the Nth two-wire path 420 from the output of the modulator 104. In response, the microcontroller 102 may, at a second time, operate on the fourth switch 408 to couple the corresponding two-wire path output connector associated with the fourth two-wire path 418 with the output of the modulator 104. Subsequently, the microcontroller 102 may send the query signal over the fourth two-wire path 418. After a period of time, when the microcontroller 102 did not detect or received a response signal, the microcontroller 102 may operate on the fourth switch 408 to decouple the corresponding two-wire path output connector associated with the fourth two-wire path 418 from the output of the modulator 104. In response, the microcontroller 102 may, at a third time, operate on the third switch 406 to couple the corresponding two-wire path output connector associated with the third two-wire path 416 with the output of the modulator 104. Subsequently, the microcontroller 102 may send the query signal over the third two-wire path 416. After a period of time, when the microcontroller 102 did not detect or received a response signal, the microcontroller 102 may operate on the third switch 406 to decouple the corresponding two-wire path output connector associated with the third two-wire path 416 from the output of the modulator 104. In response, the microcontroller 102 may, at a fourth time, operate on the second switch 404 to couple the corresponding two-wire path output connector associated with the second two-wire path 414 with the output of the modulator 104. Subsequently, the microcontroller 102 may send the query signal over the second two-wire path 414. After a period of time, when the microcontroller 102 did not detect or received a response signal, the microcontroller 102 may operate on the second switch 404 to decouple the corresponding two-wire path output connector associated with the second two-wire path 414 from the output of the modulator 104. In response, the microcontroller 102 may, at a fifth time, operate on the first switch 402 to couple the corresponding two-wire path output connector associated with the first two-wire path 412 with the output of the modulator 104. Subsequently, the microcontroller 102 may send the query signal over the first two-wire path 412. In response, the microcontroller 102 may detect or receive a response signal. As such, the microcontroller 102 may associate the identifier associated with the replacement decoder with the first two-wire path 412. By one approach, the microcontroller 102 may then initiate the memory 126 to store the association of the identifier associated with the replacement decoder with the first two-wire path 412. By another approach, the memory 126 may remove a previous association with an old decoder and add a new association with a replacement decoder.

In one implementation, the microcontroller 102 may repeat the previously described steps with another unmapped decoder-based irrigation control units until each of the unmapped decoder-based irrigation control units are mapped to corresponding two-wire paths of the plurality of two-wire paths 118. For example, the microcontroller 102 may send a second query while the corresponding two-wire path output connector associated with the first two-wire path 412 is coupled with the output of the modulator 104. In one example, the second query may include a second identifier associated with a second unmapped decoder-based irrigation control unit. Subsequently, the microcontroller 102 may determine whether a second response signal is received to determine whether the first two-wire path 412 includes the second unmapped decoder-based irrigation control unit. In one example, when the microcontroller 102 did not receive or detect the second response signal, the microcontroller 102 may decouple the corresponding two-wire path output connector associated with the first two-wire path 412 and couple a next two-wire path output connector associated with a next two-wire path with the output of the modulator 104. As such, the microcontroller 102 may repeat decoupling of currently coupled two-wire path output connector of the plurality of two-wire path output connectors and coupling of a next two-wire path output connector of the plurality of two-wire path output connectors with the output of the modulator until a corresponding response signal is received after sending a corresponding query signal for each unmapped decoder-based irrigation control unit. In one configuration, the microcontroller 102 may repeat association of a current identifier associated with a current unmapped decoder-based irrigation control unit with a current two-wire path of the plurality of two-wire paths associated with the currently coupled two-wire path output connector. Alternatively or in addition to, the microcontroller 102 may then subsequently initiate the memory 126 to store the association.

Thus, as described herein, an irrigation control system including the plurality of switches 110 may enable the irrigation control unit 120 to readily identify or determine one or more installed decoder-based irrigation control units by accessing the associations of identifiers associated with the decoder-based irrigation control units 116 with the plurality of two-wire paths 118 stored in the memory 126, where one or more of the associations are the result of the automatic mapping of unmapped decoder-based irrigation control units as described above.

In some embodiments, the memory 126 may store a plurality of logs recorded or stored over a period of time. By one approach, the irrigation control unit 120 may create a log and initiate recording or storing of the log in the memory 126 each time an automatic fault isolation operation is executed by the irrigation control unit 120. In one configuration, a log may include a listing of voltage values and/or current values read over a period of time for each of the plurality of two-wire path output connectors 112. In one example, the period of time may start at a threshold of time prior to the execution of the automatic fault isolation operation. In one application, the plurality of logs may be access by a user through the user interface 130 directly coupled with the irrigation control unit 120 and/or the user interface 130 remote from the irrigation control unit 120.

Figure 11:
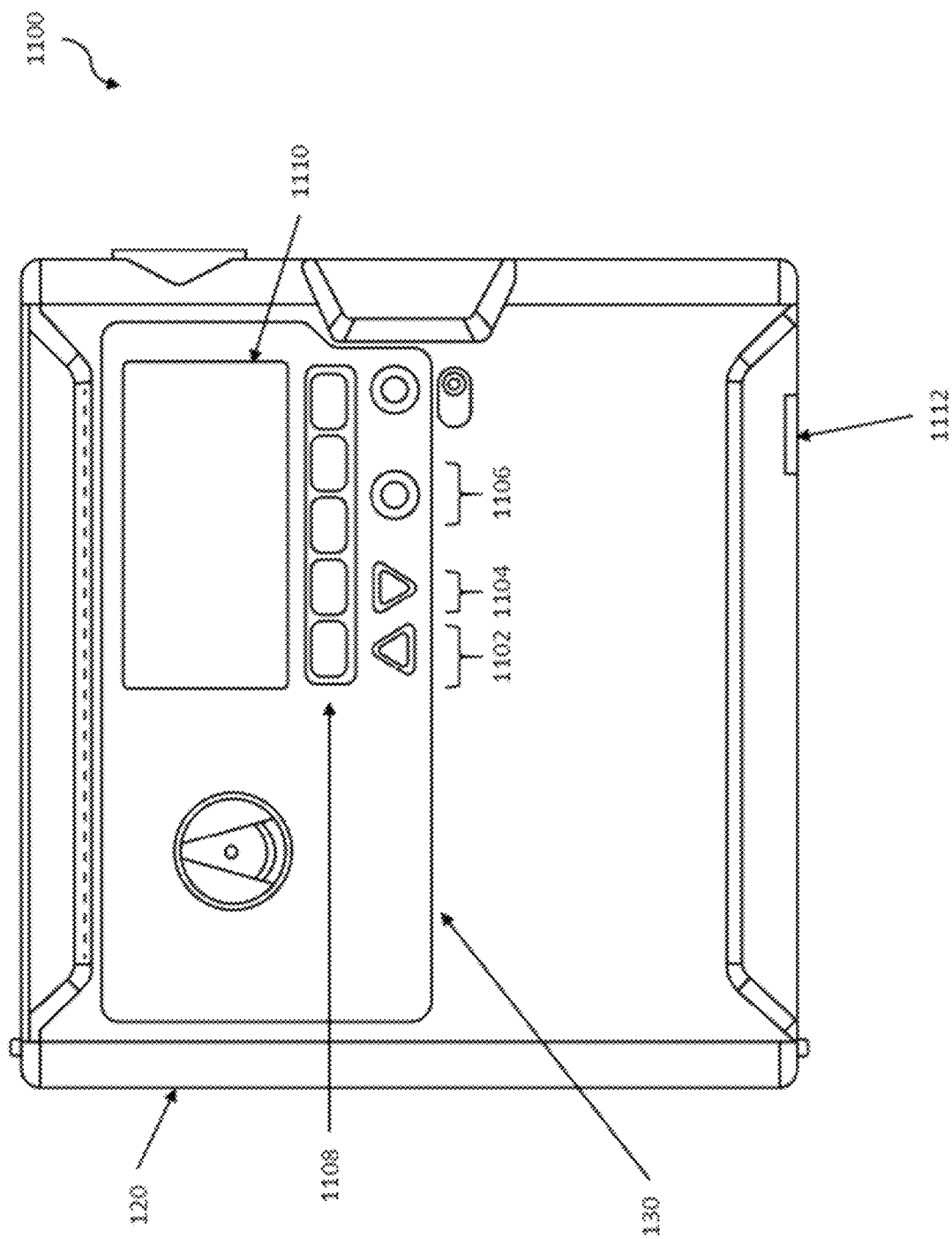
FIG. 11 shows a simplified illustration of an irrigation control unit of an exemplary irrigation control system in accordance with some embodiments.

FIG. 11 shows a simplified illustration of an irrigation control unit 120 of an exemplary irrigation control system 1100 in accordance with some embodiments. By one approach, the irrigation control system 1100 may correspond to the irrigation control system 100 of FIG. 1, the irrigation control system 200 of FIG. 2, the irrigation control system 300 of FIG. 3, the irrigation control system 400 of FIG. 4, and/or the irrigation control system 500 of FIG. 5. By another approach, the method 700 of FIG. 7, the method 800 of FIG. 8, the method 900 of FIG. 9, and/or one or more steps of the methods may be implemented in the irrigation control system 1100, the irrigation control system 100 of FIG. 1, the irrigation control system 200 of FIG. 2, the irrigation control system 300 of FIG. 3, the irrigation control system 400 of FIG. 4, and/or the irrigation control system 500 of FIG. 5. By one approach, the irrigation control system 1100 may include the irrigation control unit 120 with an integrated user interface 130. For example, the user interface 130 may be implemented in a front panel of the irrigation control unit 120, as shown in FIG. 11. By another approach, the user interface 130 may be remote from the irrigation control unit 120 and include a digital representation of the front panel. In such an approach, a user may provide a user input to the irrigation control unit 120 of FIG. 11 via a remote user interface 130 and/or via an integrated user interface 130 of FIG. 11 The front panel may include an Up Program Selector button 1102 and a Down Program Selector button 1104. The Up and Down Program Selector buttons 1102, 1104 may be associated with a plurality of programs associated with execution of one or more irrigation schedules by the irrigation control unit 120. By one approach, pressing either the Up Program Selector button 1102 and Down Program Selector button 1104 may change display screen information displayed on a display device 1110 of the user interface 130. In one configuration, pressing the Up Program Selector button 1102 may change the display screen information to display information associated with a first program of the plurality of programs. In another configuration, pressing the Down Program Selector button 1104 may change the display screen information to display information associated with a second program of the plurality of programs. In yet another configuration, pressing the Up Program Selector button 1102 a second time may change the display scene information to display information associated with a third program of the plurality of programs. In such configuration, the first program is disposed between the third program and the second program. In one example, relative to the first program, the third program is a program above the first program on a sequentially listed programs; while the second program is a program below the first program in the sequentially listed programs. Alternatively or in addition to, the front panel may include one or more Back buttons 1108 configured to enable a user to go back one step in programming. For example, by pressing one of the one or more Back buttons 1108, the user is kept from having to re-enter information that was changed. Alternatively or in addition to, the front panel may include a Context Dependent Help button 1106. By one approach, the Context Dependent Help Button 1106 may, when pressed and held by the user, display help or explanatory information depending on the information currently shown on the display 1110 of the user interface 130 or the current programming position or mode selected via the Up Program Selector button 1102 or the Down Program Selector button 1104. In some embodiments, the irrigation control unit 120 of FIG. 11 may include a port 1112. By one approach, the port 1112 may include the irrigation control port 302 described herein. By another approach, the port 1112 may include a card slot to support at least one card connection (e.g., SD card and/or any type of card connections for storage and/or wireless communication).

Figure 6:
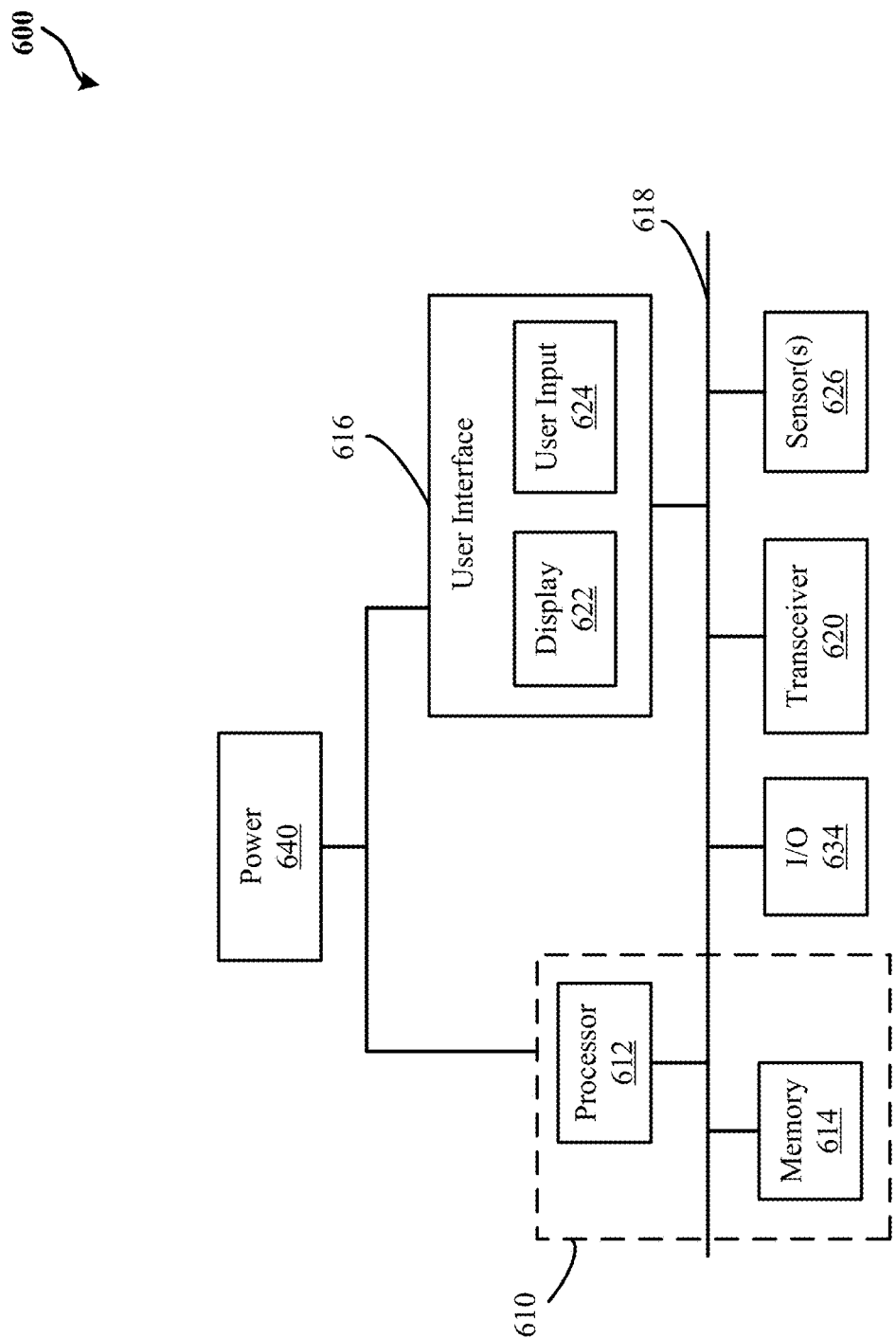
FIG. 6 illustrates an exemplary system for use in implementing methods, techniques, devices, apparatuses, systems, servers, sources and providing control over irrigation, in accordance with some embodiments.

Further, the circuits, circuitry, systems, devices, processes, methods, techniques, functionality, services, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the irrigation control system 100 of FIG. 1, the irrigation control system 200 of FIG. 2, the irrigation control system 300 of FIG. 3, the irrigation control system 400 of FIG. 4, the irrigation control system 500 of FIG. 5, and/or other above or below mentioned systems or devices, or parts of such circuits, circuitry, functionality, systems, apparatuses, processes, or devices. For example, the system 600 may be used to implement some or all of the microcontroller 102, the modulator 104, the plurality of switches 110, the test power source 114, the decoder-based irrigation control units 116, the irrigation control unit 120, the memory 126, the power source 128, the user interface 130, the decoder output unit 202, the irrigation controller 502, a control circuit of the irrigation controller, and/or other such components, circuitry, functionality and/or devices. However, the use of the system 600 or any portion thereof is certainly not required.

By way of example, the system 600 may comprise a control circuit or processor module 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be access over and/or distributed over a communications network (e.g., LAN, WAN, Internet) providing distributed and/or redundant processing and functionality.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network 618 (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more such devices.

In some embodiments, the system may include one or more sensors 626. The sensors can include substantially any relevant sensor, such as acoustic or sound sensors, temperature sensors, rain sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor readable and/or computer readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory. The memory 614 can store code, software, executables, scripts, data, patterns, thresholds, lists, programs, log or history data, and the like. While FIG. 6 illustrates the various components being coupled together via a bus, it is understood that the various components may actually be coupled to the control circuit and/or one or more other components directly.

Figure 10:
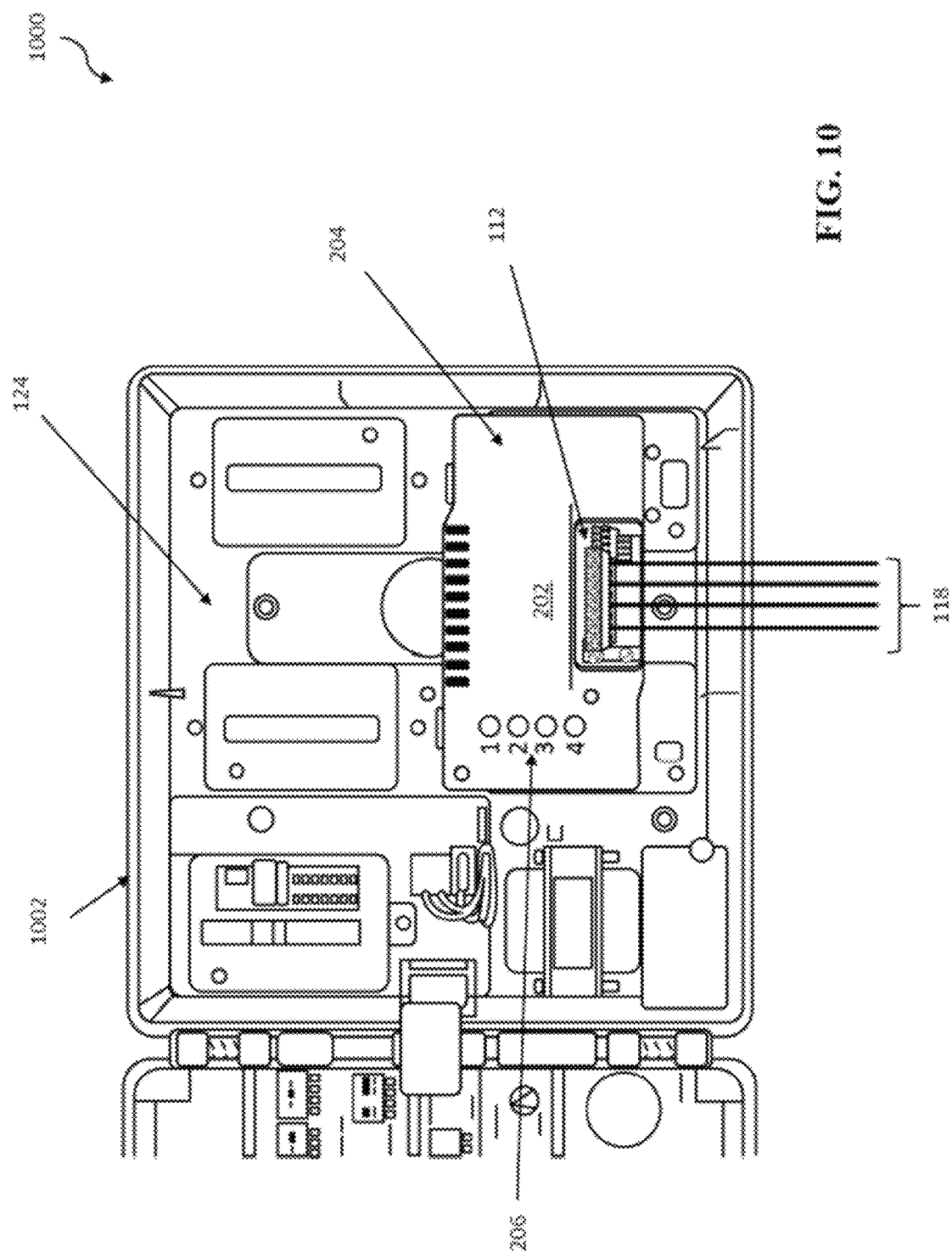
FIG. 10 shows a simplified illustration of an exemplary irrigation control system in accordance with some embodiments.

FIG. 10 shows a simplified illustration of an exemplary irrigation control system 1000 in accordance with some embodiments. By one approach, the irrigation control system 1000 may correspond to the irrigation control system 100 of FIG. 1, the irrigation control system 200 of FIG. 2, the irrigation control system 300 of FIG. 3, the irrigation control system 400 of FIG. 4, the irrigation control system 500 of FIG. 5, and/or the irrigation control system 1100 of FIG. 11. By another approach, the method 700 of FIG. 7, the method 800 of FIG. 8, the method 900 of FIG. 9, and/or one or more steps of the methods may be implemented in the irrigation control system 1000, the irrigation control system 100 of FIG. 1, the irrigation control system 200 of FIG. 2, the irrigation control system 300 of FIG. 3, the irrigation control system 400 of FIG. 4, and/or the irrigation control system 500 of FIG. 5. For example, the irrigation control system 1000 includes an irrigation controller housing 1002 and the decoder output unit 202. In one configuration, the decoder output unit 202 may include the plurality of two-wire path output connectors 112 that are coupled and external to the housing 204. In one implementation, the plurality of two-wire path output connectors 112 may be coupled to the decoder-based irrigation control units 116 described herein through the plurality of two-wire paths 118. For example, the decoder output unit 202 may receive instructions to start irrigation via the communication bus 124 (e.g., the backplane). As such, the decoder output unit 202 may output modulated power signals to the decoder-based irrigation control units 116 via the plurality of two-wire path output connectors 112 to activate a plurality of valves (e.g., valves 504 of FIG. 5) to irrigate an irrigation area. In some embodiments, the irrigation control unit 120 of FIG. 11 may be detachably coupled with the irrigation controller housing 1002. For example, when the irrigation controller housing 1002 is close, the irrigation control unit 120 may be enclosed inside the irrigation controller housing 1002. In another example, when the irrigation controller housing 1002 is open and the decoder output unit 202 is visible, as shown in FIG. 10, the irrigation control unit 120 may be detached from the irrigation controller housing 1002. Further, in some embodiments, the decoder output unit 202 may include the indicators 206, e.g., located on a portion of the housing 204 such that they are easily viewable by the user and labeled to correspond to the given output connectors 112. In this case, there is one indicator 206 for each of four output connectors 112. In some embodiments, the indicators 206 indicate a connection status associated with each of the plurality of two-wire path output connectors.

Figure 12A:
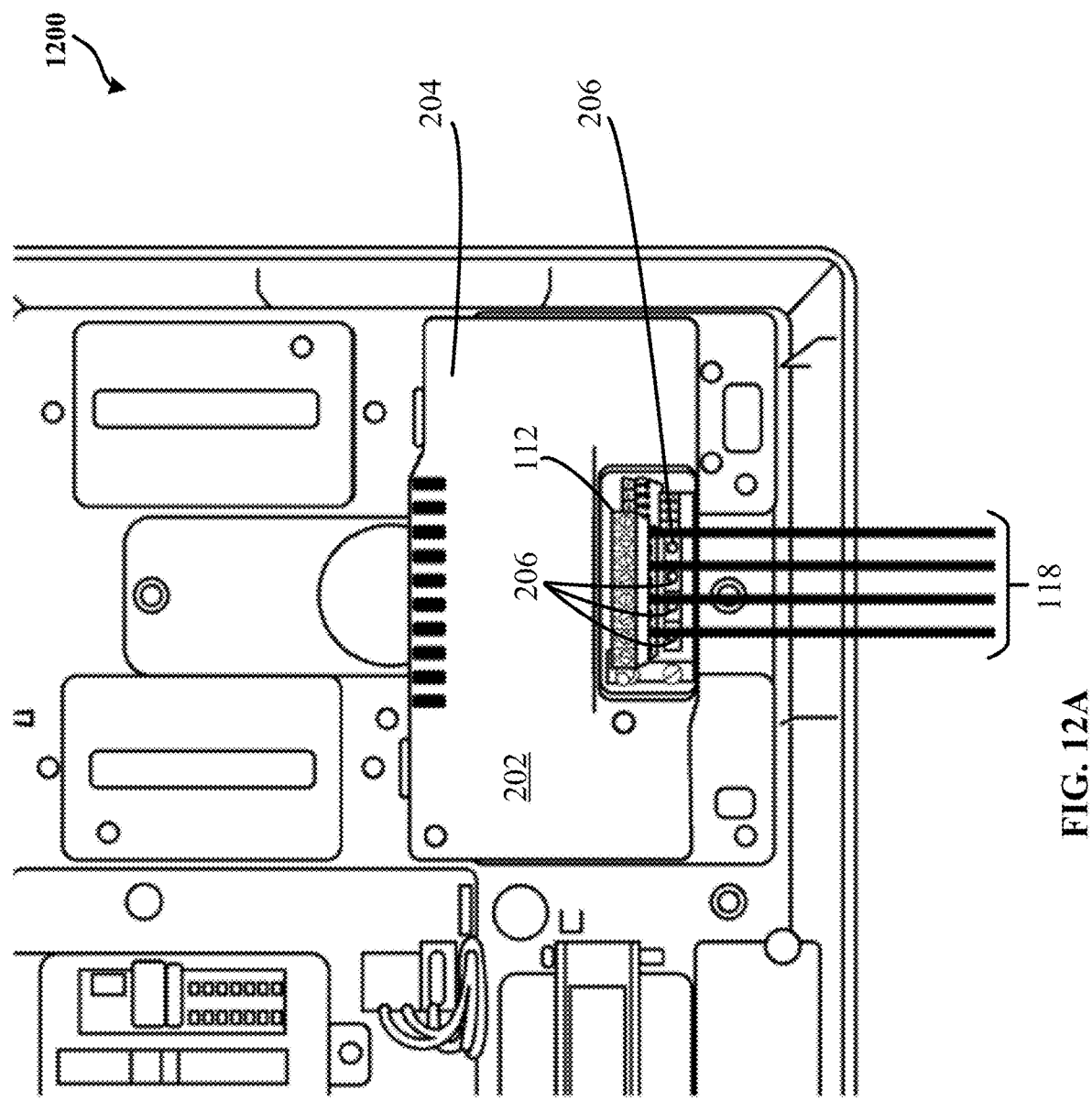
FIG. 12A shows a simplified illustration of an exemplary irrigation control system in accordance with some embodiments.
Figure 12B:
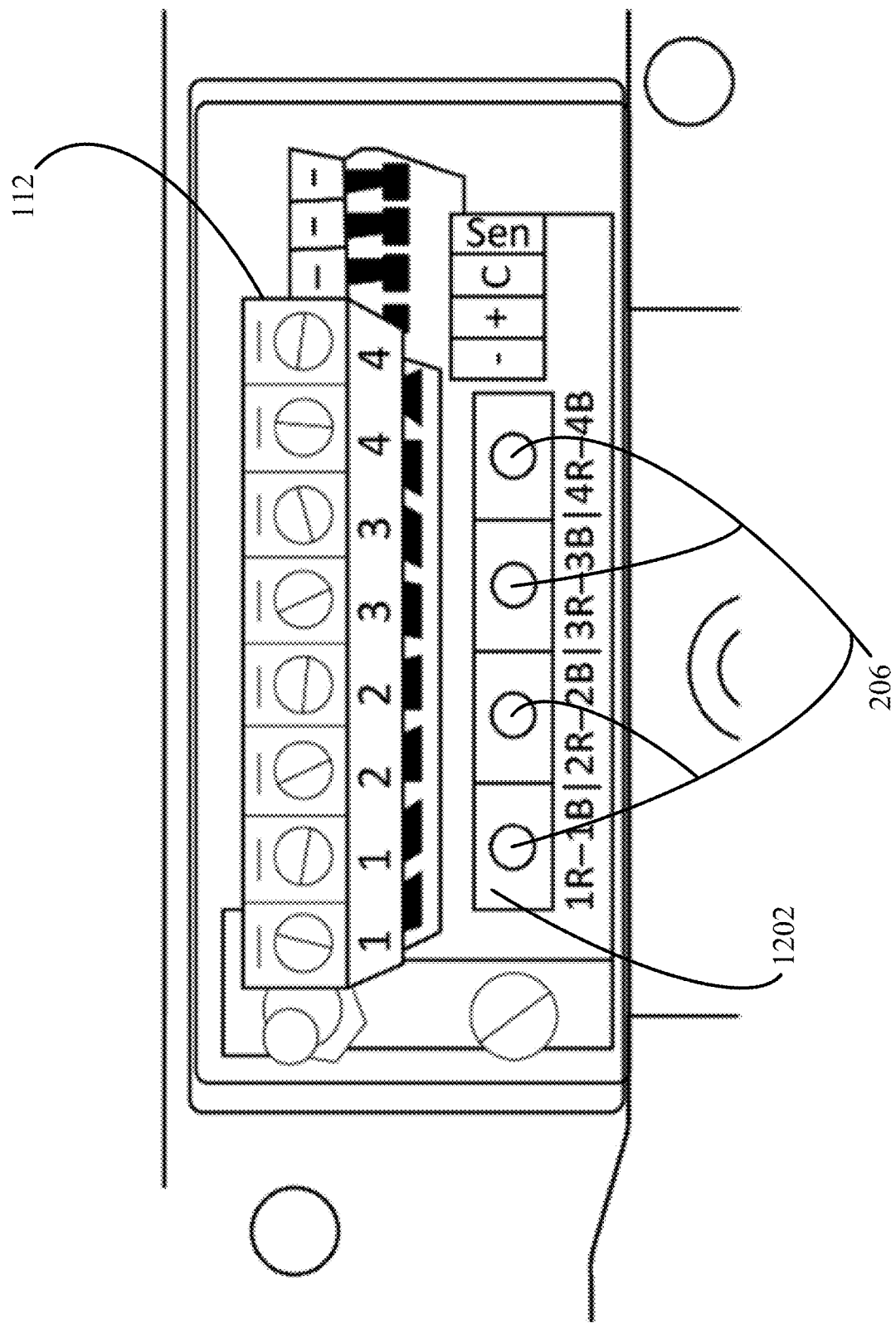
FIG. 12B shows a magnified illustration of exemplary indicators shown in FIG. 12A in accordance with some embodiments.

In some embodiments, respective indicators 206 may be located on the housing at locations proximate respective ones of the plurality of two-wire path output connectors 112 so that the user can easily understand the status of each connection. In an illustrative nonlimiting example, the indicators 206 may be located as shown in FIG. 12A. FIG. 12A shows a simplified illustration of an exemplary irrigation control system 1200 in accordance with some embodiments. In some configurations, the irrigation control system 1200 may include the same or substantially similar components as described in FIG. 10. In such a configuration, a difference between irrigation control system 1200 and the irrigation control system 1000 may be the location of the indicators 206. Those skilled in the art will recognize that a wide variety of other modifications, alterations, and combinations can also be made with respect to the location and/or design of the indicators 206 relative to the plurality of two-wire path output connectors 112, the housing 204, the irrigation control unit 120, and/or the irrigation controller as described herein without departing from the scope and/or functionality of the indicators 206, and that such modifications, alterations, and combinations are to be viewed as being within the ambit of the inventive concept. By one approach, as in the illustrated embodiment, the indicators 206 may be located proximately below the plurality of two-wire path output connectors 112. In such an approach, each indicator of the indicators 206 may correspond to a particular connector pair of the plurality of two-wire path output connectors 112. In one configuration, FIG. 12B shows a magnified illustration of exemplary indicators 206 shown in FIG. 12A in accordance with some embodiments and including labeling. In this way, each indicator 206 visually corresponds to a given connector pair of the output connectors 112. For example, the indicator (labeled 1R-1B) corresponds to the connector pair (labeled 1) of output connectors 112, and so on. In some implementations, since the indicators are in a location where they may be exposed to physical contact (e.g., from wires, tools, hands, etc.), an indicator cover 1202 may be placed and/or snapped over the indicators 206. In some embodiments, the indicators 206 are coupled to a circuit board, and the cover snap fits into openings of the circuit to cover the indicators 206. In such an implementation, the indicator cover 1202 may protect the indicators 206 from being damaged and/or snagged by the plurality of two-wire paths 118, a user, an installer, and/or a customer, to name a few. By one approach, the indicator cover 1202 may comprise a plastic cover and/or other types of nonconductive materials capable of protecting the indicators 206. For example, the indicator cover 1202 may include a plurality of holes matching the count of a number of indicators 206. In another example, the indicator cover 1202 may include a material capable of propagating through, transferring and/or projecting the light emitted from the indicators 206. In another example, the indicator cover 1202 may include a material capable of propagating through, transferring and/or projecting each color of light emitted from each of the indicators 206.

By one approach, the indicators 206 are coupled to and controlled by the microcontroller 102 of the module 204. In this approach, the microcontroller determines (has knowledge of or can sense or detect) one or more of the following: the connection of a given two-wire path 118 to a given one plurality of two-wire path output connectors 112, whether the switches 110 are operating to connect the given two-wire path output connector 112 to the modulator 104 or to the test source 114, and/or detects whether there is a fault (e.g. short) in given two-wire path 118. With this information, the microcontroller controls the operation of (causes operational power to be selectively provided to) the indicators 206 to illuminate to the indicate the connection status associated with each of the two-wire path output connectors 112. By another approach, each of the plurality of indicators 206 may be electrically disposed between a corresponding switch of the plurality of switches 110 and a corresponding one of the plurality of two-wire path output connectors 112. By another approach, each of the plurality of indicators 206 may be electrically disposed between the corresponding one of the plurality of two-wire path output connectors 112 and a first one in a series of a respective set of the decoder-based irrigation control units 116. In these arrangements, the indicator illuminates when sufficient power flows to or through the output connector 112. If there is a fault in the two-wire path 118 and/or if a two-wire path 118 is not connected, the indicator 206 may not illuminate.

It is noted that while FIGS. 10, 12A and 12B illustrate the indicators 206 on the housing of the module 204, it is understood that the indicators 206 may be coupled to other portions of the backplane housing. In these embodiments, the indicators 206 would still be visible to the user without having to view the display device 1110 of the user interface of the controller.

In some embodiments, the indicators 206 are configured to indicate a connection status associated with each of the plurality of two-wire path output connectors. In some embodiments, the connection status associated with the output connectors 112 may be an indication of one or more of the following non-limiting examples: whether the switches 110 are operating to electrically connect or disconnect the modulator 104 and/or the test power source 114 and the connectors 112; whether the controller is in normal operation or diagnostic operation, whether a two-wire path 118 is physically connected to a connector 112; whether there is a fault (e.g., short or break) in a two-wire path 118 connected to the connector 112; whether power is being provided to the output connector 112, and so on. In some embodiments, the indicators 206 illuminate to indicate connection status, and may be any illuminatable device, such as one or more single or multiple color bulbs or light emitting diodes (LEDs). In some embodiments, an indicator 206 may light up one color (e.g., green) when a corresponding two-wire path 118 is connected to a corresponding two-wire path output connector 112, and/or when the switches 110 are operated to connect the modulator 104 to the connected two-wire path output connector 112. Further, the indicator 206 may light up another color (e.g., red) when a corresponding two-wire path 118 is disconnected from a corresponding two-wire path output connector 112, and/or when the switches 110 are operated to disconnect the modulator 104 and to connect the test power source 114 to the connected two-wire path output connector 112. In some embodiments, the indicator 206 may light up a color (e.g., red) when there is an electrical short in the corresponding two-wire path 118 or at the connector 112. In such an embodiment, during the short, the corresponding two-wire path 118 of the indicator 206 may be isolated by operating the switch 110 corresponding to the path 118 to disconnect the output connector 112 from the modulator 104. In other embodiments, the indicator 206 may only light up (for example, red color, amber color, and/or any color to alert a user that there is a problem) when there is a connection issue associated with the connection status, e.g., when a two-wire path has a detected short condition, when the corresponding two-wire path output connector 112 is disconnected from the two-wire path 118, and so on.

In some embodiments, the indicators 206 are coupled to and controlled by the microcontroller 102 of the module 204, and the indicators 206 indicate the connection status of the modulator 104 (and main power supply) to the output connectors 112 via the respective switches 110. That is, the indicators 206 indicate whether or not the switches 110 are operating to electrically connect the modulator 104 to the output connectors 112 or not. For example, if a given switch 110 is operated by the microcontroller 102 to electrically connect the modulator 104 to the respective output connector 112, the given indicator 206 is illuminated in a first color. In this switch arrangement, the indicator 206 illuminates in the first color regardless of: whether the modular 104 is supplying power to the output connector via the switch 110; whether or not there is a respective two-wire path 118 connected to the output connector 112; and/or whether the controller is in normal operational mode or in diagnostic mode. If the given switch 110 is operated by the microcontroller 102 such that the modulator 104 is electrically disconnected with the respective output connector 112, the given indicator 206 will either not be illuminated or will be illuminated in a second color, regardless of: whether or not there is a respective two-wire path 118 connected to the output connector 112; and/or whether the controller is in normal operational mode or in diagnostic mode. Thus, at a glance, the user can visually see the connection status associated with the output connectors 112 by the indicators 206 (in this case, the connection status is whether the modulator 104 is electrically connected to the output connector 102 regardless of whether the modulator is supplying power, operational mode, and/or whether a two-wire path is connected). In some embodiments (such as shown in FIGS. 3-4), when the given switch 110 is operated to disconnect the modulator 102 from the output connector 112, the given switch 110 electrically connects the test power source 114 to the given output connector 112 and the indicator is illuminated in a second color. In this case, the indicator 206 illuminates in the second color regardless of: whether the test power source 114 is providing power to the output connector 112; whether or not there is a respective two-wire path 118 connected to the output connector 112; and/or the operational mode of the controller. Thus, in this embodiment, at a glance, the user can visually see the connection status associated with the output connectors 112 by the indicators 206 (in this case, the connection status is whether the modulator 104 or the test power source 114 is electrically connected to the output connector 102 regardless of whether the modulator is supplying power, the operational mode of the controller and/or whether a two-wire path is connected).

By one approach, the indicator 206 may include miniature light emitting diode (LED), high-power LED, flash LED, bi-color LED, tri-color LED, red-green-blue (RGB) LED, alphanumeric LED, and/or lighting LED. In some embodiments, the microcontroller 102 may switch the color emitted by the indicator 206 based on the state of the switch, status of the corresponding two-wire path output connector 112 and/or the corresponding two-wire path 118. In one configuration, the microcontroller 102 may switch the color emitted by the indicator 206 based on a change in the state of the switch, the connection status and/or the electrical connectivity status between of the corresponding two-wire path output connector 112 and/or the corresponding two-wire path 118.

It is understood that embodiments described herein are applicable to a variety of decoder-based irrigation control systems, such as traditional decoder systems and more advanced systems in which the devices connected to the two-wire path include demodulators to demodulate data sent by the modulators on the power signal, and may control the operation of various devices, such as solenoid activates valves, sensors, and/or other devices.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An output unit for an irrigation controller to output encoded signals to decoder-based irrigation control units, the output unit comprising:
    a housing;
    an input port configured to be detachably coupled to a port of the irrigation controller;
    a microcontroller coupled to the input port and configured to receive irrigation control instructions from the irrigation controller;
    a modulator coupled to a power source and the microcontroller, wherein the modulator is configured to output modulated power signals comprising operational power and data modulated based on control signals from the microcontroller;
    a plurality of switches coupled to an output of the modulator and independently controlled by the microcontroller; and
    a plurality of two-wire path output connectors each coupled to a corresponding one of the plurality of switches, wherein each of the plurality of two-wire path output connectors is configured to be connected to a corresponding two-wire path of a plurality of two-wire paths which extend out of the irrigation controller and to which multiple decoder-based irrigation control units can be connected and controlled, the decoder-based irrigation control units being configured to receive the modulated power signals from the corresponding two-wire path, wherein the microcontroller is further configured to operate the plurality of switches to couple and decouple the modulated power signals from the output of the modulator to one or more of the plurality of two-wire path output connectors.

2. The output unit of claim 1, wherein, prior to a start of a diagnostic operation of the irrigation controller, one or more first switches of the plurality of switches couple the output of the modulator with one or more first two-wire path output connectors of the plurality of two-wire path output connectors and one or more second switches of the plurality of switches couple a test power source with one or more second two-wire path output connectors of the plurality of two-wire path output connectors, and wherein a test power source controlled by the microcontroller and configured to output a current limited output signal useful to determine which one of the multiple decoder-based irrigation control units caused a short condition.

3. The output unit of claim 1, further comprising:
    a test power source coupled to and controlled by the microcontroller and configured to output a current limited output signal useful to determine which one of multiple decoder-based irrigation control units caused a short condition; and
    a current sensor configured to detect the short condition at one or more of the plurality of two-wire path output connectors coupled to the test power source during a diagnostic operation.

4. The output unit of claim 1, wherein the power source comprises an alternating current power supply.

5. The output unit of claim 1, wherein the housing comprises at least the microcontroller, the modulator, and the plurality of switches, and further comprising a decoder port detachably coupled to a backplane of the output unit, wherein the decoder port is coupled to the irrigation controller and the power source via the backplane.

6. The output unit of claim 1, further comprising a decoder port, wherein the housing comprises at least the microcontroller, the modulator, and the plurality of switches, and wherein the decoder port is detachably coupled to an irrigation control port of an irrigation control unit.

7. The output unit of claim 1, further comprising the plurality of two-wire paths coupled to the plurality of two-wire path output connectors, wherein each two-wire path of the plurality of two-wire paths comprises a respective set of a multiple decoder-based irrigation control units.

8. The output unit of claim 7, further comprising the multiple decoder-based irrigation control units coupled to and controlled by the microcontroller to activate a plurality of valves to irrigate an irrigation area.

9. The output unit of claim 1, further comprising a test power source coupled to and controlled by the microcontroller and configured to output a current limited output signal useful to determine which one of the multiple decoder-based irrigation control units caused a short condition, wherein the plurality of switches are operated by the microcontroller to couple and decouple one of the modulated power signals from the output of the modulator and the current limited output signal from the test power source to a selectable one of: one and multiple of the plurality of two-wire path output connectors.

10. The output unit of claim 1, wherein the modulator is a single modulator that outputs identical modulated power signals to each switch of the plurality of switches.

11. A method for an output unit for an irrigation controller to output encoded signals to decoder-based irrigation control units, the method comprising:
    receiving, by a microcontroller coupled to an input port detachably coupled to a port of the irrigation controller, irrigation control instructions from the irrigation controller;
    outputting, by a modulator coupled to a power source and the microcontroller, modulated power signals to a plurality of switches, the modulated power signals comprising operational power and data modulated based on control signals from the microcontroller; and
    operating independently, by the microcontroller, the plurality of switches to couple and decouple the modulated power signals from an output of the modulator to one or more of a plurality of two-wire path output connectors that are each coupled to a corresponding two-wire path of a plurality of two-wire paths which extend out of the irrigation controller and to which multiple decoder-based irrigation control units can be connected and controlled.

12. The method of claim 11, further comprising:
    outputting to one or more first switches of the plurality of switches by the modulator, the modulated power signals; and
    outputting to one or more second two-wire path output connectors of the plurality of two-wire path output connectors, by a test power source controlled by the microcontroller, a current limited output signal useful to determine which one of the multiple decoder-based irrigation control units caused a short condition.

13. The method of claim 11, further comprising:
outputting, by a test power source coupled to and controlled by the microcontroller, a current limited output signal useful to determine which one of the multiple decoder-based irrigation control units caused a short condition; and
detecting, by a current sensor, the short condition at one or more of the plurality of two-wire path output connectors coupled to the test power source during a diagnostic operation.

14. The method of claim 11, wherein the power source comprises an alternating current power supply.

15. The method of claim 11, wherein the irrigation controller and the power source are coupled to the output unit via a decoder port detachably coupled to a backplane of the output unit, and wherein the microcontroller, the modulator, and the plurality of switches are enclosed in a housing.

16. The method of claim 11, wherein the microcontroller, the modulator, and the plurality of switches are enclosed in a housing and detachably coupled to an irrigation control port of an irrigation control unit via a decoder port.

17. The method of claim 11, wherein each two-wire path of the plurality of two-wire paths comprises a respective set of a multiple decoder-based irrigation control units coupled to the output unit via the plurality of two-wire path output connectors.

18. The method of claim 11, further comprising controlling the multiple decoder-based irrigation control units by the microcontroller to activate a plurality of valves to irrigate an irrigation area.

19. The method of claim 11, further comprising outputting, by a test power source coupled to the microcontroller, a current limited output signal useful to determine which one of the multiple decoder-based irrigation control units caused a short condition, wherein the plurality of switches are operated by the microcontroller to couple and decouple one of the modulated power signals from the output of the modulator and the current limited output signal from the test power source to a selectable one of: one and multiple of the plurality of two-wire path output connectors.

20. The method of claim 11, wherein the modulator is a single modulator that outputs identical modulated power signals to each switch of the plurality of switches.

* * * * *